United States Patent [19]
Watanabe

[11] Patent Number: 5,799,185
[45] Date of Patent: Aug. 25, 1998

[54] METHOD AND SYSTEM FOR MANAGING SYSTEM MEMORY RECLAMATION

[75] Inventor: Yoshiki Watanabe, Nakai-machi, Japan

[73] Assignee: Fuji Xerox Co., Ltd., Tokyo, Japan

[21] Appl. No.: 623,991

[22] Filed: Mar. 29, 1996

[30] Foreign Application Priority Data

Apr. 10, 1995 [JP] Japan ................... 7-107780

[51] Int. Cl.$^6$ .................. G06F 12/00; G06F 17/30
[52] U.S. Cl. .................. 395/622; 395/614; 395/403; 395/445
[58] Field of Search .................. 395/622, 618, 395/621, 614, 612, 403, 445

[56] References Cited

U.S. PATENT DOCUMENTS

| | | | |
|---|---|---|---|
| 4,989,132 | 1/1991 | Mellender et al. | 395/705 |
| 5,321,834 | 6/1994 | Weiser et al. | 395/600 |
| 5,355,483 | 10/1994 | Serlet | 395/650 |
| 5,392,432 | 2/1995 | Engelstadt et al. | 395/700 |
| 5,398,334 | 3/1995 | Topka et al. | 395/600 |
| 5,463,770 | 10/1995 | Todd | 395/600 |
| 5,485,613 | 1/1996 | Engelstadt et al. | 395/650 |
| 5,526,519 | 6/1996 | Muruyama et al. | 395/600 |
| 5,535,390 | 7/1996 | Hildebrandt | 395/700 |
| 5,604,902 | 2/1997 | Burkes et al. | 395/622 |
| 5,615,362 | 3/1997 | Jensen et al. | 395/614 |
| 5,649,139 | 7/1997 | Weinreb et al. | 395/412 |

FOREIGN PATENT DOCUMENTS

A-5-173869  7/1993  Japan.
A-5-225034  9/1993  Japan.

OTHER PUBLICATIONS

"Garbage Collection in an Uncooperative Environment", Hans–Juergen Boehm, Mark Weiser, Software Practice and Experience, vol. 18(9), (1988) pp. 807–820.

Primary Examiner—Thomas G. Black
Assistant Examiner—Jean R. Homere
Attorney, Agent, or Firm—Oliff & Berridge PLC

[57] ABSTRACT

To enable automatic recovery even of data areas that are referenced from other areas when conducting garbage collection. This memory managing method makes it possible to designate locations in which pointers are contained when securing data areas. Data areas that are referenced from locations that are designated as pointers are not recovered. Rather, data areas that are referenced from locations that are not designated as pointers are recovered when not referenced as pointers from other areas. In addition, the address of a procedure that is called with the address of the data area as a parameter is recorded when this data area is recovered in correspondence with each data area that is the target of management. When it is determined that there are no references to the data area that is the object of management, the procedure that corresponds to that data area is called with the address of that data area as a parameter and following that the data area is recovered.

19 Claims, 22 Drawing Sheets

FIG. 1A

```
struct part {
    int oid;
    connection* from ;
    connection* to ;
    char* smallText ;
    char* largeText ;
};
...
void deallocPart(struct part* part)
{
    Parts [part→oid] = NULL;   //p deleted from management table
    free)part→large_text);       // other resources freed
}
struct part* Parts = (struct part*)allocate_object(PART_NUM*sizeof
                     (struct part*), NULL, 0, (DeallocFunc)NULL);
struct part* load_part(int id)
{
    const char pointers =0x70; //  01110000(2)
    struct part * p =(struct part*)allocate_object(sizeof(struct part),
                     &pointers ,5,(DeallocFunc)deallocPart );
    p→oid = id;
    p→smallText =(char*) allocate_object(SMALL_TEXT_SIZE, NULL,
                     0,NULL);
    p→largeText =(char*)malloc (LARGE_TEXT_SIZE) ;
    Parts[id]=p   //p registered in management table
    ...// contents of p read from secondary memory
    return p;
}
```

FIG.3

METHOD AND SYSTEM FOR MANAGING SYSTEM MEMORY RECLAMATION

BACKGROUND OF THE INVENTION

1. Field of the Invention

The present invention relates to a memory managing method in a program. More particularly, this invention relates to a method that automatically recovers the data area of a memory using a garbage collection function or recovers the cache area in an object-oriented database management system that caches and uses permanent objects.

2. Description of Related Art

Because areas that can be used disappear as the areas of the memory which are assigned as areas for data of the application program are used to capacity, it is necessary to free up memory. Consequently, as methods of managing memory, for example in UNIX systems, there are methods for securing and freeing up areas using the commands "malloc/free" that have been prepared beforehand. This system is such that an area is secured by the command "malloc." Objects that have become unnecessary are freed by the command "free" so that this is a method where areas are secured when it is expressly designated from the application program that this area is to be used. When this area becomes unnecessary to the application program, the fact that this area is unneeded is expressly designated. The problem with this method is that when which area is to be freed is not clearly indicated in the application program by the "free" command, it is possible that necessary areas could be freed while areas that are no longer is use could remain unfreed.

A garbage collection is used to eliminate this. This garbage collection automatically frees up areas that are no longer used from the data areas that are dynamically secured in memory by the application program. In garbage collection, when unreferenced areas remain after looking up the references from the areas in the application program, these areas are considered to be unused and a process freeing these areas is automatically executed. Garbage collection requires pointers. Consequently, this has come to be used in language processing in which it is possible to distinguish integer values and pointers to data areas, such as Lisp and Smalltalk.

However, it is desirable to have garbage collection functions for other languages that do not have data structures that allow integers and addresses to be distinguished, such as C or C++. Research has been conducted to determine how to realize garbage collection given the premise that integers and addresses cannot be distinguished. For example, a method that determines the absence or presence of a reference to a area, considering integer values also as pointers is provided by Hans-Juergen Boehm and Mark Weiser in *Garbage Collectioning an Uncooperative Environment*, Software-Practice and Experience, Vol. 18, No. 9, pretax profits. 807–820, 1988, the subject matter of which is incorporated herein by reference. Further, Japanese Laid-Open Patent Publication Hei 5-173869, the subject matter of which is incorporated herein by reference discloses a method wherein only areas in which integer values and pointers cannot be distinguished are expressly freed by the program.

The conventional method disclosed by Hans-Juergen et al. is a method that conducts management of data objects by holding a group of data objects, which are data items of a specific unit assigned to data areas in the memory, in a holder of a specific size (e.g., 4092 bytes) that is called a "chunk" and creating a list of the addresses (the addresses of the head of the chunk) of the holder. In addition, each holder (chunk) has a pointer to the entry of the corresponding list. The address of the data object in the holder becomes the address of the holder by changing the lower 12 bits to 0. By paying attention to this kind of relationship, it is possible to find data that is retrievable by determining whether or not this data is a pointer during garbage collection. That is to say, in garbage collection, the variable value that is the integers or the pointer held by the application program or the variable value that is one of the pointers is considered the address of one of the object holders by changing the lower 12 bits to 0 and the pointer to the entry of the list that should correspond to this is found. It is then determined whether the contents of the memory location that is obtained through this pointer matches the value that is considered the address of the object holder. If this matches, the relationship between the data object and the holder that holds this and the list used in managing the data object, is satisfied and the determination is that the variable value of the application program is a pointer while this is determined to not be a pointer when such is not the case. The results of the determination are held as a mark bit and retrieval of areas is conducted based on this mark bit.

The conventional method of Japanese Laid-Open 5-173869 is a method where management is conducted by dividing the data objects into those recovered through garbage collection and those expressly recovered from the application program.

In an object-oriented database management system, the object that is stored in secondary memory is temporarily taken into main memory. To speed this process up, an object managing method has been proposed in Japanese Laid-Open Patent Publication Hei 5-225034, the subject matter of which is incorporated herein by reference, in which the contents of the object are cached in the main memory. An object table is used in which the addresses of the areas of this object are stored.

That is to say, with this object managing method, the object-oriented database management system manages the permanent object of the secondary memory apparatus and the main memory apparatus. However, in this management, an object table is used that is placed in the cache area of the main memory apparatus. This object table in the main memory apparatus has a data structure including fields for an object identifier OID, a disk address of the permanent object in the second memory apparatus and a memory address for the permanent object in the main memory apparatus. When data is requested by designating an object identifier OID from the application program, the object-oriented database management system consults the object table. If the corresponding memory address is registered, this memory address is returned. If this address is not recorded, the permanent object having the object identifier OID designated from the secondary memory apparatus is read into the cache area of the main memory apparatus. The address indicating this position is registered in the memory address field of the object table and this address is returned to the application program. The application program directly refers to the data through the address which was obtained.

In conventional methods, it is fundamentally impossible to conduct recovery of the necessary data areas in the case where integers and holders cannot be distinguished.

However, with the first conventional method, it is impossible during garbage collection to forcibly recover data areas where references from the application program remain.

Consequently, there are concerns that the utilization efficiency of the memory will worsen.

For example, there are cases where the application program has a management table that manages the data through an identifier and the data is accessed using this management table. In this kind of structure, the data that is managed by the management table is always data referenced from the application program. Consequently, references from the application program remain during garbage collection so that recovery of these areas through garbage collection has been impossible.

In addition, in Japanese Laid-Open 5-173869, it is necessary to provide an instruction to expressly recover from the application program. Consequently, description of the application program becomes more complex. In addition, when the above-described table is used in data areas where garbage collection is possible there are concerns that areas that cannot be recovered will be created as described above.

With a conventional object managing method as in Japanese 5-225034 the permanent object that which has been read into the cache area of the main memory apparatus cannot be recovered until the transactions and processes of the application program have been concluded. Accordingly, because objects that have been manipulated from the application program remain until the transactions and application program have been concluded, large memory resources are needed to run the program.

As shown in FIG. 23, when the application program 231 requires object data, if data is requested by providing the identifier OID to the object-oriented database management system 232, the object-oriented database management system 232 uses the management table and returns the stored address (holder) of the permanent object in the main memory apparatus corresponding to the identifier. The application program 231 directly references the permanent object data of the cache area in the main memory apparatus 234 through the stored address that was obtained. Because this direct reference exists, the object-oriented database management system 232 cannot determine which data can be recovered after reference from the application program has concluded and accordingly has no means for recovery.

A structure has also been considered where direct referencing from the application program is eliminated and all referencing is through the object-oriented database management system. However, when this is done speed slows and performance worsens making practical application difficult.

In addition, even if a retrieval process for data areas including the cache area is conducted through conventional garbage collection, a reference from the management table remains for the permanent object of the cache area. Consequently, recovery of this area through garbage collection is impossible.

SUMMARY OF THE INVENTION

It is an object of the present invention to solve the above problems.

It is an object of the present invention to provide a memory managing method and database management system that can automatically recover data areas that are referenced from other areas when conducting garbage collection.

It is another object to provide a memory managing method that can set processes that differ for each data area that is recovered when conducting garbage collection. The memory managing method can also free resources that are linked to these data areas and renew the management information.

It is another object to provide an object managing method for an object-oriented database management system and a data management system that can recover and reuse permanent object areas in the cache area that are not referenced from the application program.

The present invention provides a memory managing method that recovers a data area which is not pointed to by a pointer as an empty data area from the data areas on which data is recorded in the main memory. Pointer information that designates whether or not data that has been recorded in each data area managed by the data area management information is included in the data area management information of at least one of the above-described data areas. In the process of recovering empty data areas, only data that has been recorded on data areas designated as pointers by the pointer information contained in the data area management information is recognized as pointers regardless of whether the data recorded in the data areas is the original pointer.

In the data area of a specified unit size that records data there are a plurality of locations (positions) that hold pointers and data that is not pointers. The management information is information that specifies where in these locations pointers are stored. For example, when the data that is held in the data area is an object and each object is assumed to include a plurality of variables that are integers and pointers if "01110" is specified as information indicating the location of pointers. The second, third and fourth variables are pointers while the remaining first and fifth variables are non-pointers. During garbage collection, in general data that is referenced from the application program and all data that can be referenced from the application program such as data that is further referenced from the data which is referenced from the application program are marked. As a result, data areas for data that is not marked and cannot be referenced is freed. With the present invention, when this kind of reference relationship is found, the management information indicates the location of data indicating pointers is found and this management information is given priority. That is to say, data which is in actuality a pointer and this management information designates as a non-pointer even if this is data which should be a reference source is not used as valid data as a reference source. Only the reference from the location of the data indicating a point is used as valid data as a reference source. Accordingly, with the present invention, it is possible to specify that pointers do not exist in the data area. Consequently, even if references through pointers are included in actuality it is possible to automatically recover these reference targets.

In addition, another characteristic of the present invention is, in the above-described memory managing method, to attach address information for a procedure (for example, deallocFunc) that is called when recovering data areas is attached to the management information to call and execute this procedure from this address information when recovering data areas. As procedures to call, it is possible to conduct appropriately freeing of resources with a broad meaning such as processes that free resources and other areas this area references and file closing processes for when the data area contains operations on a file that has been opened based on the type of data in the data area.

In addition, the present invention including a management table that contains as data that is recorded in the data area, an object that is the target that is referenced from the application program and at least a pointer to the object. The management table manages the object. The pointer information that is contained in the data area management information that manages the data area on which the management table has been recorded designates the pointers to the objects contained in the management table are not pointers. For example, the pointers are set to 0 in the object holder header 122 in FIG. 12 and the object holder header 212 in FIG. 21.

Conventionally, objects that are managed by management tables were indicated by the pointers of the management table. Consequently, in examining the absence or presence of referencing during garbage collection, all objects that were managed were determined to be with reference, it was impossible to recover these through garbage collection. However, with the present invention, non-pointer information is set as described above. Consequently, recovery of the objects is possible.

The object managing method of the present invention is of the type in an object-oriented database management system that manages by reading the permanent object from the secondary memory apparatus and holding this in the cache area of the main memory apparatus. A variable area (e.g., global variables/local variables) in which the application program holds values containing the reference address of the area (e.g., handlers) of the permanent object in the cache area is provided in the main memory apparatus. In the area of each permanent object in the cache area, when reference is not made from either the variable area or the area of another permanent object is referenced from the variable area excluding the area of this permanent object, the area of the permanent object is recovered and is reused as a new permanent object area.

In a conventional object-oriented database management system that manages the permanent object by holding this object in the cache area of the main memory apparatus, there was no method for recovering and recycling areas for objects that were no longer used in the cache area. In addition, it was impossible to conduct recovery even with garbage collection. The present invention adds a sequence for recovering from the cache area as an object managing method for an object-oriented database management system.

When a permanent object in the cache is requested from the application program, an object-oriented database management system returns the address thereof when this permanent object is held in the cache area. The application program holds this address in the variable area and accesses this directly for the cache area as necessary. Accordingly, the present invention pays attention to this point and makes it possible to determine the permanent objects of a cache area that can be recovered by finding permanent objects that are referenced (including, indirect referencing - referencing from a permanent object that is referenced from the variable area) for the cache area from the variable area.

In this way, with the present invention it is possible to recover and recycle, in the process that secures areas for permanent objects, areas of permanent objects that are not referenced from the application program when there are not sufficient areas. Consequently, it is possible to restrict the size of the cache and to run the application program even with limited memory resources.

In addition, in the above-described object managing method, when the structure is such that information (the object table cache in FIG. 14) indicating the identifier of the permanent objects, the storage address (e.g., the disk address) in the secondary memory apparatus and the recording address (e.g., the memory address) in the cache area is recorded as management information of the permanent object area. Information indicating the identifier of the corresponding permanent objects or the memory location of each corresponding memory address is recorded in the permanent object area that the memory address indicates by finding the mutual setting relationship that is set between the memory address that is held in the management information and the memory location of the memory address or the identifier of the permanent object, it is possible to examine whether or not the value in the variable area is that references the permanent object in the cache area. In addition, it is possible to conduct writing of the determination results as the value of the mark because there is a two-way referencing relationship.

With one of these specific modes, in the cache area are provided: a permanent object management table (13111 in FIG. 13) that has entries that cause a correspondence among the identifier of the permanent objects, the storage address in the secondary memory apparatus, pointers to the permanent object handlers in the cache area and marks indicating the absence or presence of reference from the application program to the permanent objects at this memory address. A permanent object handler (13112 in FIG. 13) that has a pointer to the area corresponding to the permanent object management table and holds the permanent object that has been read from the secondary memory apparatus. In the permanent object retrieval process when all of the data that the application program holds is considered to be pointers, permanent object handlers pointed to by this are found, and permanent object handlers found through this are mutually referenced to one of the areas of the permanent object management table, the permanent object of this permanent object handler is determined to have a reference from the application program. The results of this determination are set as the aforementioned marks for the corresponding areas and a permanent object that was not determined to have a reference from the application program on the basis of this mark that has been set is recovered.

In addition, another characteristic of the object managing method of the present invention is an object managing method of the type in an object-oriented database management system that manages by reading the permanent object from the secondary memory apparatus and holding this in the cache area of the main memory apparatus. A variable area (e.g., global variables/local variables) on which the application program holds values containing the reference address of the permanent object area (e.g., the handler) of the cache area is provided in the main memory apparatus. When the recovery process of the cache area is conducted, in each permanent object area in the cache area, for the permanent object area that is referenced from the variable area, the contents are deleted while invalid is assigned as the condition information. For the area of the permanent object that is excluded from the permanent object area that is referenced from the variable area, this area is recovered and is reused as a new permanent object area.

In general, the contents of the data that the permanent object handler holds is data that is read from data stored in the secondary memory apparatus. Consequently, even if the contents are deleted, it is possible to restore these contents as necessary through rereading. The present invention pays attention to this point and the permanent object that is understood to be referenced form the variable area is such that the contents are deleted and the condition information is provided indicating invalidity. Through this, when the contents are restored, if this condition information is found and invalidity is attached, it is fine to read the corresponding permanent object from the secondary memory apparatus. With the present invention, the areas of permanent objects that are indirectly referenced, that is to say of permanent objects which are referenced only from permanent objects, can be recovered. Consequently, the recovery rate of areas increases and it is possible to increase the utilization efficiency of the memory.

In addition, the present invention is a memory managing method for an object-oriented database management system that manages permanent objects by recording in the cache area of the main memory apparatus the permanent object that has been read from the secondary memory apparatus and the management table that manages access corresponding to this permanent object while recording in the main memory apparatus (outside the cache area) management information that is used to secure the cache area for the permanent object and the management table and to conduct recovery. The management table holds information that establishes a correspondence among identifier of the permanent object, the storage address of the permanent object in the secondary memory apparatus and the pointer (memory address) to the permanent object in the cache area. The management information has non-pointer information that is considered to be invalid as the reference basis in the examination of the absence or presence of reference for recovery. Address information for the procedure called during recovery, while for the pointer of the management table, all non-pointer information is designated. In addition, the procedure called during recovery contains a process that sets the pointer of the management table corresponding to the permanent object that is recovered to NULL. In the recovery process for the permanent object in the cache area, the permanent object to be recovered is determined based on the non-pointer information of the management information and the absence or presence of a reference from the variable area that is the data area in the main memory apparatus that holds the variable of the application program and a procedure that sets the pointer to NULL is called and executed.

As described above, for pointers to the permanent object in the management table, all designate non-pointer information. Consequently, the pointers in the management table are all considered invalid as reference bases in examining the absence or presence of references for recovery. In a conventional permanent object cache, the permanent object that had been read into the cache area could not be recovered due to being referenced by the management table. However, with the above-described composition of the present invention, references from the management table are considered invalid. Consequently, recovery is possible. In addition, the procedure called during recovery contains a process that sets to NULL the pointers of the management table corresponding to permanent object that are recovered. Consequently, it is possible to conduct renewal of the management table accompanying recovery.

As the procedure called during recovery of permanent object areas where management information has been set there is a process to free the data areas expressly when data areas other than the cache area in which the permanent object that is recovered is managed separately are referenced besides the above description.

In addition, in a database management system of the present invention includes a reading device that reads the permanent object into the data area in the cache from the secondary memory apparatus on which the permanent object is stored, in accordance with requests from the application program. An empty data area determination device that determines whether or not empty data areas exist for reading permanent objects from the secondary memory apparatus using the reading device. A reference determination device that determines whether or not the permanent object that exists in the cache has been referenced from the application program when it has been determined by the empty data area determination device that empty data areas do not exist. An empty data area retrieval device that recovers as the empty data area the data area in the cache in which a permanent object exists that has been determined to have been referenced from the application program by the reference determination device.

Other objects, advantages and salient features of the invention will become apparent to one skilled in the art from the following detailed description.

BRIEF DESCRIPTION OF THE DRAWINGS

The invention will be described with reference to the following drawings in which like reference numerals refer to like elements and wherein:

FIG. 3 is a diagram showing an example of code for the application program of the first embodiment;

DETAILED DESCRIPTION OF PREFERRED EMBODIMENTS

First Embodiment

FIGS. 1 through 12 show a first embodiment of the present invention.

Figure 1:
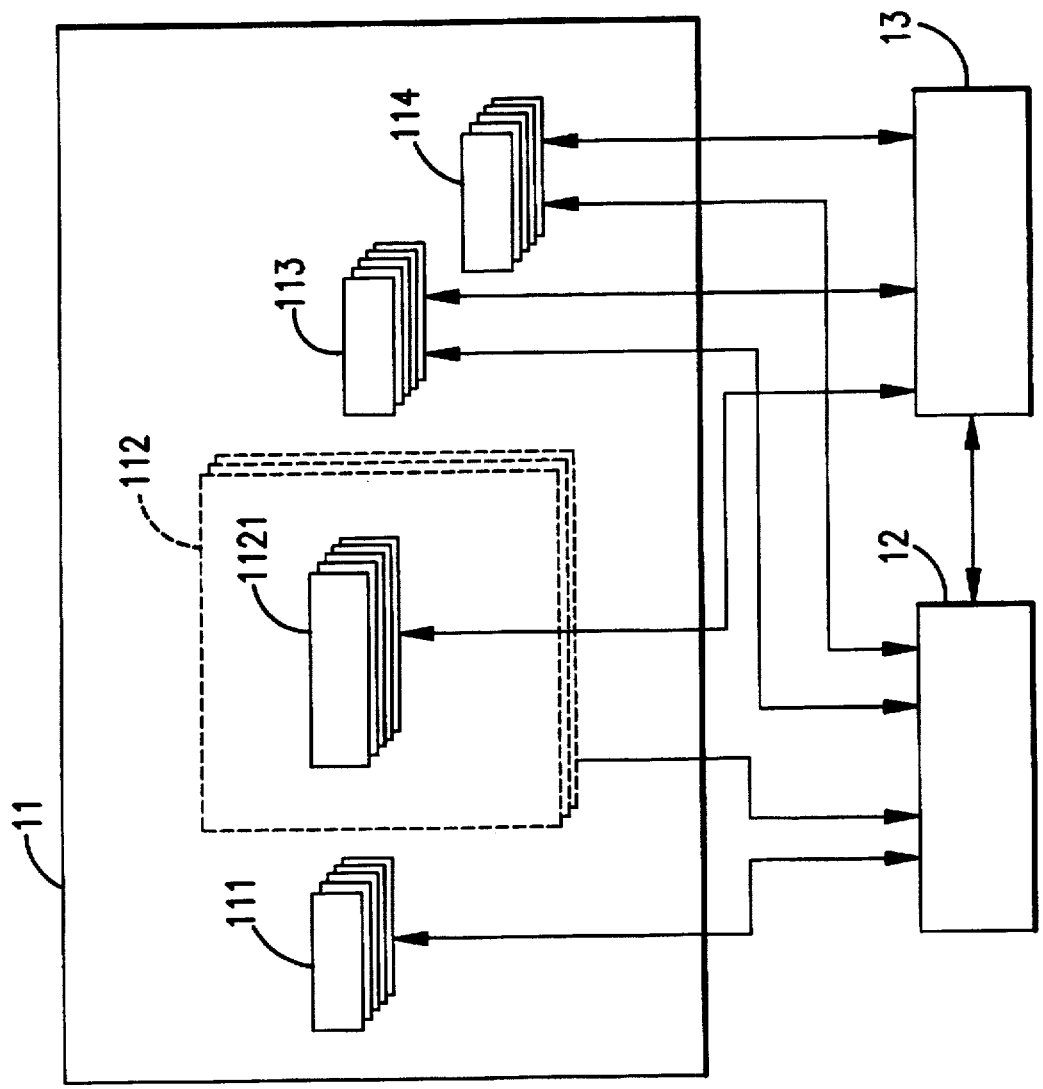
FIG. 1 is a block diagram of the system used to execute the memory managing method of a first embodiment of the present invention.

FIG. 1 is a summary function block diagram of the system used to execute the memory managing method of the present invention.

The system is equipped with a main memory apparatus 11, a memory management module 12 and an application program 13. The main memory apparatus 11 stores objects created by the application program 13. An area 1121 of the object becomes the target of management of the memory management module 12 and is secured in the memory management space 112. The information used to manage the object area 1121 is also stored in the main memory apparatus 11 as management information 111. Furthermore, data areas for global variables 113 and local variables 114 are also stored in the main memory apparatus as a condition of execution of the application program 13. The memory management module 12 manages the memory management space 112 which is provided in the main memory apparatus and secures and automatically recycles the area 1121 for objects from requests from the application program 13.

Figure 2:
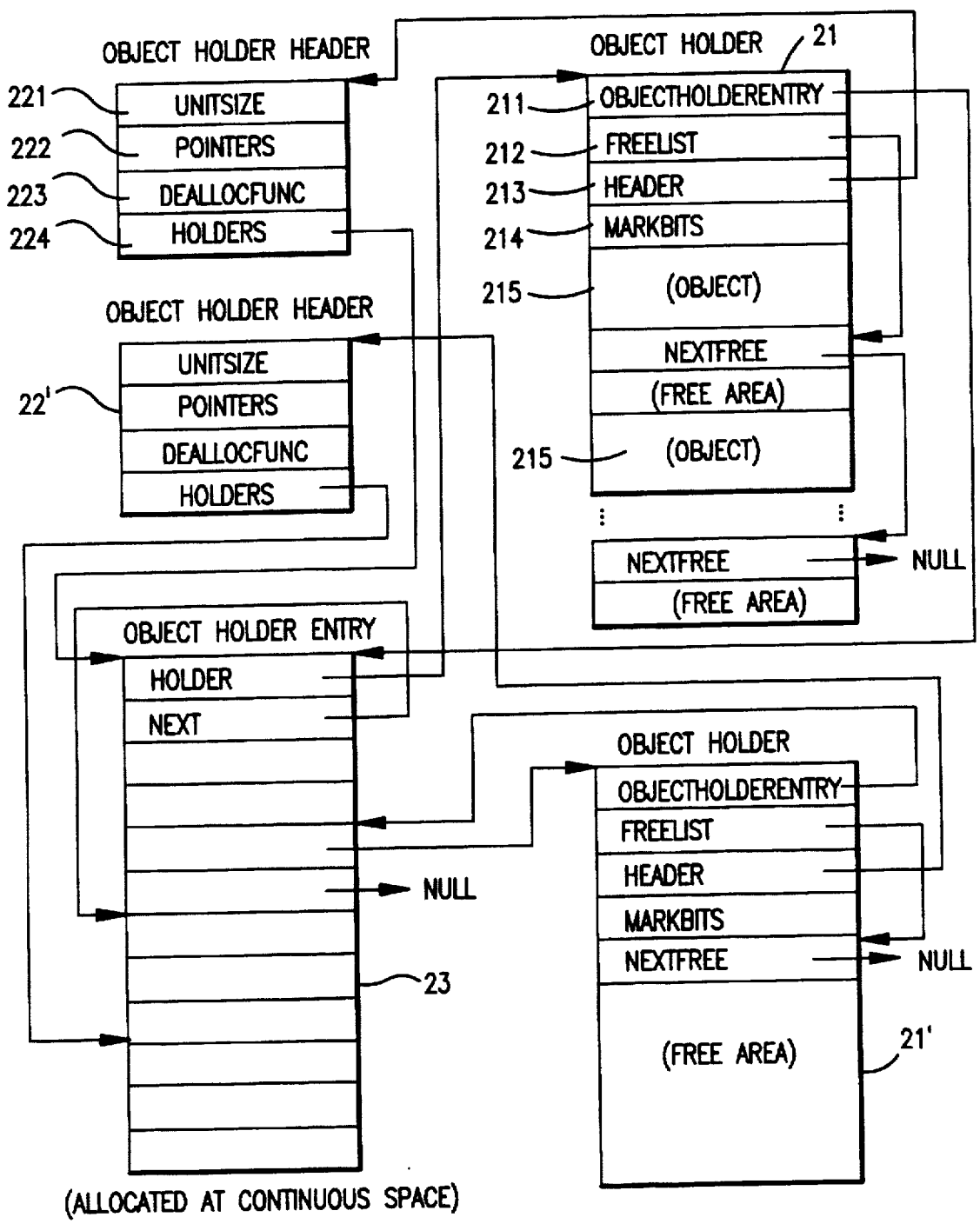
FIG. 2 is a diagram showing the structure of the memory space in the first embodiment.
Figure 4:
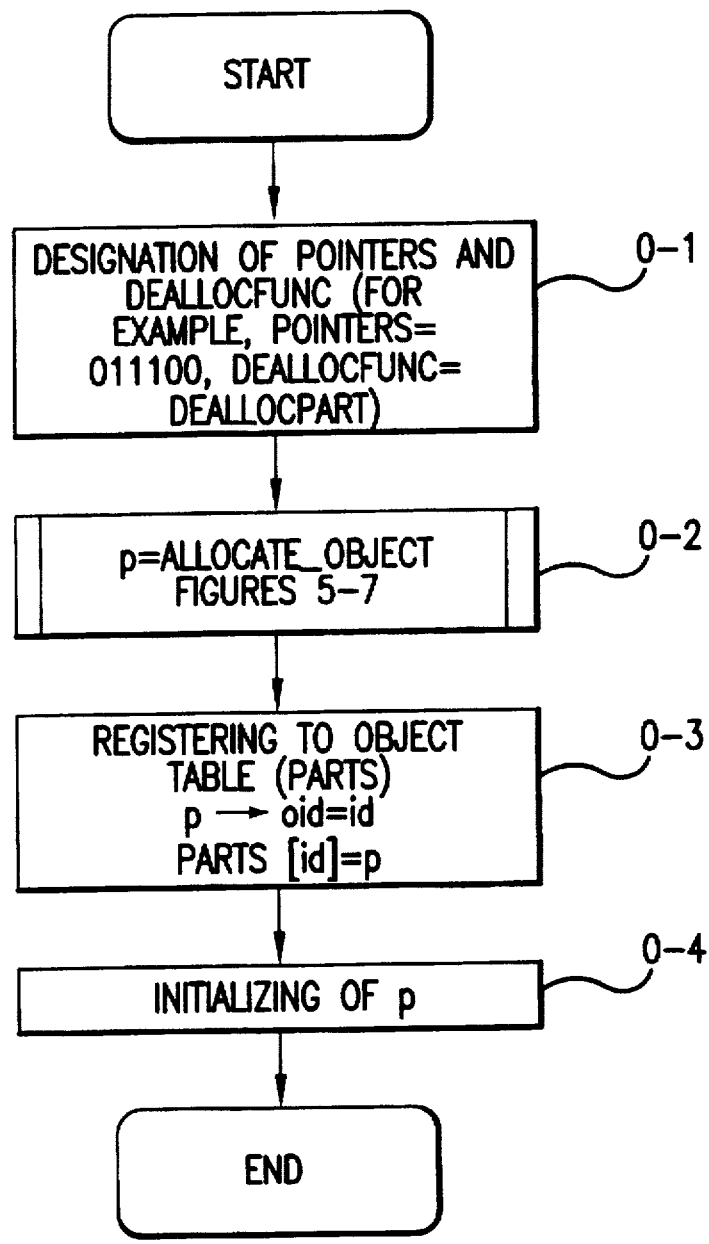
FIG. 4 is a drawing showing the flow of the process of securing permanent object areas.

FIG. 2 is a drawing showing the detailed composition of the memory management space 112 of FIG. 1. Object holders 21 and 21' are parts used to secure the areas 1121 for objects that are the target of management by the memory management module 12. A plurality of object holders 21 and 21' exist in the memory management space 112. In each object holder 21 and 21', the size of the secured area (unitSize) 221, the bit string (pointers) 222 indicating the position of the pointer in the area, and the procedure (deallocFunc) 223 that is called when the area is recovered are attached to correspond to each other. This information is provided in separate areas of the object holders 21 and 21' as object holder headers 22 and 22'. The object holders 21 and 21' hold the pointers 213 to these object holder headers. In one of the object holder headers, only an area where the size, the position of the pointer in the area and the procedure that is called when the area is recovered are the same is provided. With the bit row 222 that shows the position of the pointer within the area, the region of the object secured by the object holder corresponding to the object holder header shows whether or not it is a candidate for image recovery in the garbage collection. Hereafter, recorded data is not regarded as being a pointer, irrespective of whether or not a pointer is present, and furthermore comprises a reference region for the data recorded in its region. Regions not indicated by the pointer by means of the bit row 222 that shows the position of the pointer within the region become candidates for image recovery in the garbage collection. With the data that is continuously recoded in the secondary recording, the bit row 222 corresponding to the region within the object holder for securing the read-in data region are recorded if there is no pointer present. Minute processing of the garbage collection is explained hereafter with reference to the flow chart(s). Details of the garbage collection process are described below. At the top of the object holders 21 and 21', the address of the node of the object holder entry 23 that references this object holder is recorded as the object holder entry 211. Besides this, there is a freeList 212 that holds the empty areas in a list format and markBits 214 that record the absence or presence of referencing during recovery retrieval of the areas. In addition, the object holder is secured in the main memory apparatus so that the size is an integer multiple of 2n. Here, the object holder is secured so that 212=4096 bytes.

One object holder 22 holds the above information and references the corresponding one or more object holders 21 by the object holder entry 23.

The object holder entry 23 links a plurality of object holders through a list structure. In addition, the object holder entries 23 is positioned in a continuing area in the main memory apparatus.

For a memory management space 112 structured in this manner, the memory management module 12 conducts securing and automatic recovery of areas by requests from the application program 13.

Hereafter, the contents of this process are described. The process of securing areas is run by the application program 13. FIG. 3 shows an example of code requested by the application program 13.

In FIG. 3, "struct part { }" defines the type of object and the object designates five variables and the types of these variables.

Next, the part "void deallocPart{ }" expresses the process that is called when the object is recovered. In addition, the part "Parts=..." calls the procedure "allocate_object" using the memory management module and expresses that the areas of the object management table are given specified properties and are secured.

The part "load_part(int id) { }" codes the contents of the process related to reading the object into the memory management space of the main memory apparatus. This is expressed in the form of a flowchart and comprises steps (0-1) to (0-4) of FIG. 4. In step (0-1) pointers and deallocFunc are specified. In FIG. 3, the specification is that pointers=01110 and deallocFunc=deallocPart. In step (0-2) of FIG. 4, the area for the object is secured and the fact that this address is held in variable p is expressed. The calling of procedure "allocate_object( )" expresses the need to secure an area in the memory management module 12 and in this example, the assignment is to secure an area that is called by deallocPart( ) at the time of recovery that is an area in which the second, third and fourth variables are pointers and the size is "size of(struct part)" as the area for the object "part".

Next, in step (0-3), the area that has been secured is registered in the object table and the contents indicating the variable p are read from the secondary memory apparatus.

The procedure whereby the memory management module 12 secures the area having received a command from the application program 13 is shown in FIGS. 5 through 11.

This procedure is run by the application program. As parameters for this procedure, the application program passes the size of the area being secured, a bit string indicating the location of the pointer, and a procedure that is called when the area is recovered. These are inserted in variables s, p and f, respectively, in step (1-1).

In the following step (1-2), object headers in which size=s, pointers=p and deallocFunc=f are detected from the object holder headers that already exist. As a method for high speed searching of these, there is a method where the object holder headers are arranged in order of Size and after those with size=s have been found through a two-part search, those in which deallocFunc and pointers are the same are detected from among these. In addition, an index is attached to all or part of size, pointers and deallocFunc through a method such as Hush or B-tree, making it possible to increase the speed of the search.

In step (1-3), a determination is made whether the object holder headers exist as a result of the detection of object holder headers. Furthermore, if these object holder headers exist, empty areas in the corresponding object holder are searched for and if no empty areas exist, empty areas are secured by conducting recovery of the areas using garbage collection (steps (1-6) to (1-12)). When there is a failure in recovery of the areas, an object holder corresponding to this is created and added (steps (1-15) to (1-19)). Or, when these object holder headers do not exist, a new object holder header is created (steps (1-13) to (1-14)) and object holders corresponding to this are created and added (steps (1-13) to (1-19)).

That is to say, from the determination in step (1-3), if this object holder header exists, the address thereof is substituted into variable hh in step (1-4).

In step (1-5), the contents of the holder of the object holder header pointed to by the variable hh are substituted into variable n.

In step (1-6), a determination is made whether variable n is NULL. If n is not NULL, the contents of the holder of the object holder entry pointed to by n is substituted into h in step (1-7).

In step (1-8), a determination is made whether h→freeList, that is to say, freeList of the object holder pointed to by the variable h, is NULL. If h→freeList is not NULL, the contents of h→freeList are substituted into variable o in step (1-9), and o→nextFree is substituted into h→freeList. Thus o is returned to the application program. Through this, the empty area to which h→freeList was pointing becomes the area being used so that the application program can use this.

If h→freeList is NULL in step (1-8), this indicates that there are no empty areas in the object holder. Consequently, in step (1-10), the next node n→next is removed from the list of entries of the object holder entry and the program returns to step (1-6).

When h→freeList is not NULL in step (1-8), the contents of h→freeList are substituted into variable o as an area that has been secured in step (1-9) and this is returned to the application program. Accordingly, freeList is cycled down. That is to say, h→freeList is made o→nextFree.

In addition, if n is NULL in step (1-6), no empty areas remain, and hence, garbage collection recovery of areas is conducted in step (1-11).

In step (1-12), a determination is made as the result of the recovery of areas. If recovery of areas was successful, the program returns to step (1-5) and again detects empty areas.

If there were no failure in the recovery of areas, the program moves to step (1-15) and creates a new object holder.

At this time, when the usage amount of the memory management space exceeds a predetermined size, creation of the object holder is not executed and it is also possible to communicate to the application program that an error occurred in securing areas.

If these object holder headers do not exist in step (1-3), the program moves to step (1-13) and a new object holder header is created. At this time also, if the usage amount of the memory management space exceeds a predetermined size, it is also possible not to create the object holder header and to notify the application program that an error occurred in the securing areas.

In step (1-14), the address of the newly created object holder header is substituted into variable hh. In step (1-15), a new object holder is created, and the address thereof is substituted into variable h in step (1-16).

In step (1-17), a node of the object holder entry for the object holder created in step (1-15) is secured. The address of the node that has been secured is then substituted into variable n in step (1-18).

In step (1-19), pointers are set in both directions between the node pointed to by variable n and the object holder pointed to by variable h. Following this, the program moves to step (1-9) to secure the required areas.

Figure 8:
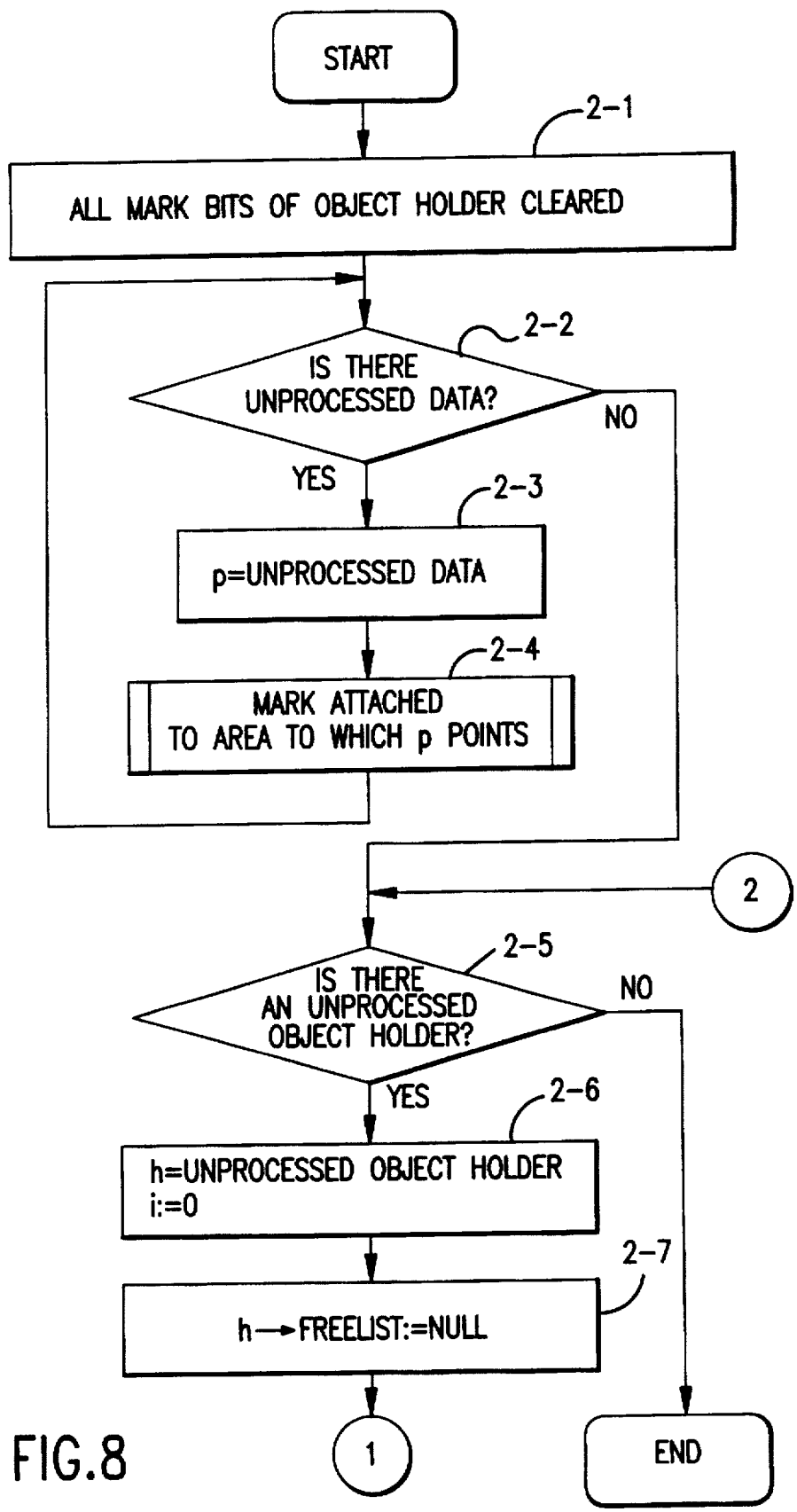
FIG. 8 is a flowchart (part 1) showing the operation of a process for recovering areas.
Figure 9:
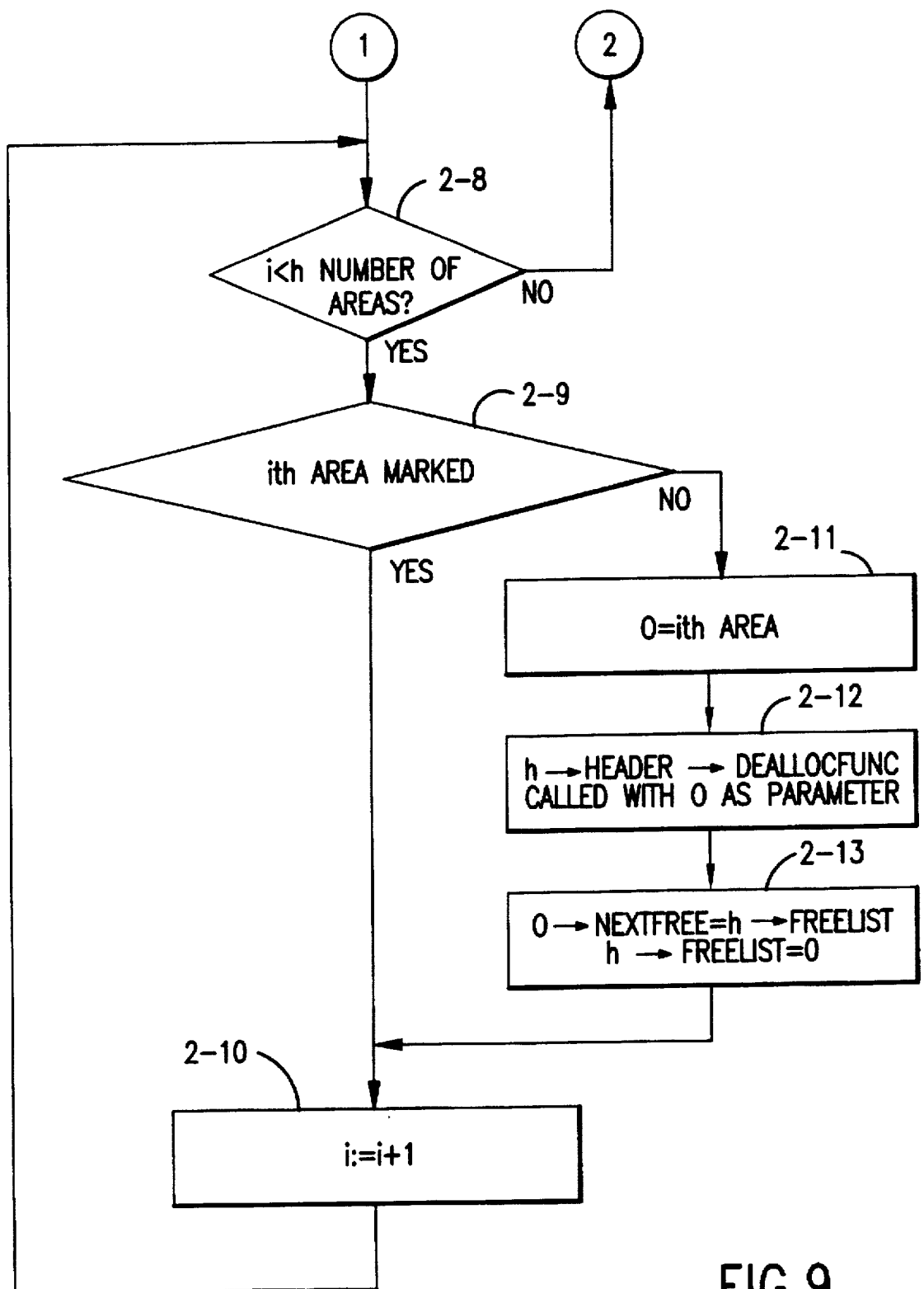
FIG. 9 is a flowchart (part 2) showing the operation of a process for recovering areas.

FIGS. 8 and 9 show the sequence in which the memory management module 12 recovers areas. This sequence is based on the mark sweep method explained in above article authored by Hans-Juerger et al.

First, in step (2-1), the markBits of all the object holders are initialized. Then, from step (2-2) to step (2-4), all data stored in the global variables and local variables in the application program are extracted and a process that attaches marks to this data is called. The contents of the global variables and the local variables of the application program can be extracted from the data areas and stacks and registers when this program is run in a general OS such as UNIX.

When a determination is made in step (2-2) that the process that attaches marks to this data has been completed, the program moves to step (2-5). From step (2-5) to step (2-13), a process to recover the areas for all of the object holders is conducted. In the midst of these systems, from step (2-8) through step (2-13), a recovery process is conducted for all of the areas of one object holder.

Step (2-9) makes a determination whether a mark has been attached to the i-th area. If a mark has been attached, i is incremented by 1 and the program returns to step (2-8) and conducts the process of recovering the next area.

In addition, if a mark has not been attached, the procedure dealloc-Func is called with the address of that area as a parameter from step (2-11) to step (2-13). A process is conducted such as freeing of resources that are referenced in addition to adding this area to the top of freeList.

When the determination is made in step (2-5) that the process of recovery has been completed for all of the object holders, the process as a whole is completed.

Figure 10:
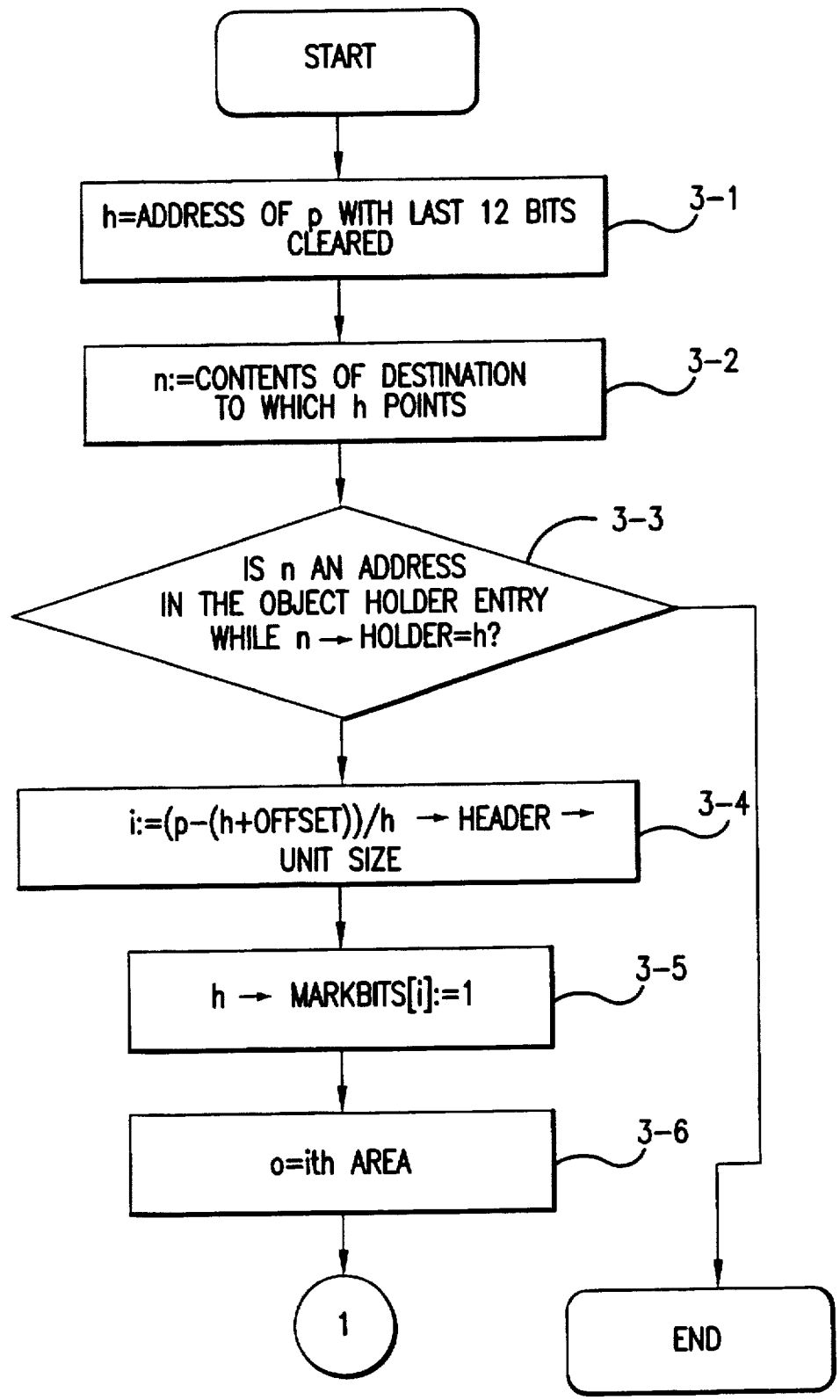
FIG. 10 is a flowchart (part 1) showing the operation of a process for attaching marks to areas in the first embodiment.
Figure 11:
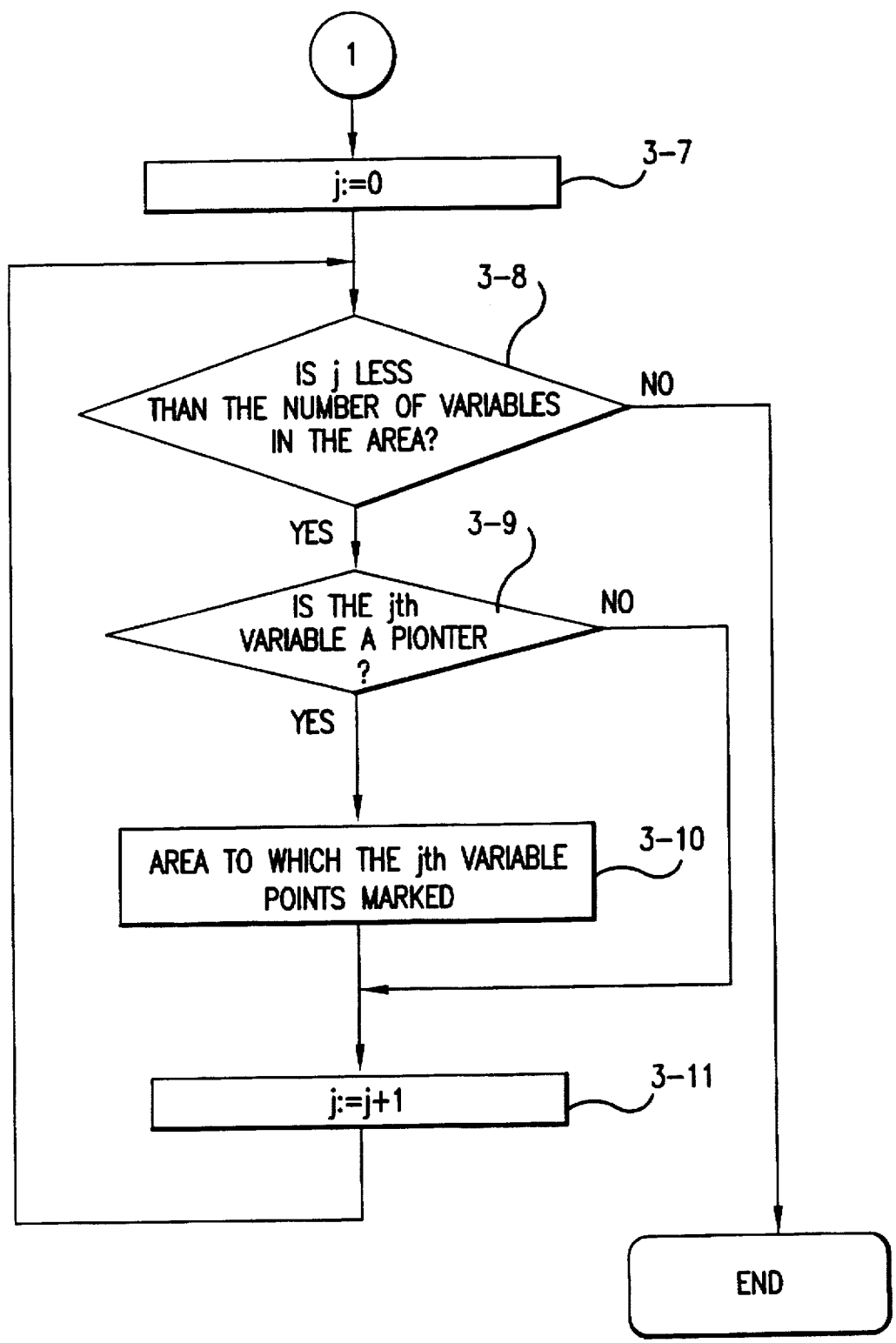
FIG. 11 is a flowchart (part 2) showing the operation of a process for attaching marks to areas in the first embodiment.

FIGS. 10 and 11 show the sequence of marking the areas that are called in step (2-4) of FIG. 8.

This procedure receives as parameter p the data which is a possible address of the areas. In step (3-1), an address in which the last bit 12 of the value of this parameter p is cleared to 0 is substituted into variable h. In this example, if the value of p is an address, the value with the last bit 12 set to 0 is the address at the top of the area of the object holder containing p. Furthermore, the address of the node of the object holder entry corresponding to this object holder is stored in this address as shown in FIG. 2.

Next, in step (3-2), the contents to which the variable h points are substituted into variable n.

In step (3-3), a determination is made whether the value of the variable n is an address in the object holder entry while n→holder=n. That is to say, a determination is made whether this corresponds to a pointer which is mutually set between the nodes corresponding to the object holder entries when this object holder was created.

If the result of the determination in step (3-3) is yes, the variable h is the address of the object holder and the variable n is the node of the object holder entry corresponding to this. In addition, p is the address pointing to the area in the object holder to which h points. Hence, from step (3-4) to step (3-11), a mark is attached to the area to which p points. That is to say, in step (3-4), which area this is in the object holder is found by calculating (P−(h+offset))/h→header→unitSize and the variable i is set to the result. Furthermore, in step (3-5), the i-th bit markBits[i] of the markBits string is set to 1. Then, in step (3-6), the i-th area is substituted into the variable o. In step (3-7), the variable j is set to 0 and in the loop from step (3-8) to step (3-11), the variable data in the i-th area to which p points is successively found. In step (3-9), a determination is made whether the j-th variable in the i-th area is a pointer. At this time, the pointers 222 of the corresponding object holder header 22 in FIG. 2 are referenced. In the case of variables that are designated as pointers by pointers 222, in step (3-10), a process is called that attaches a mark to the other areas to which these points point with these contents as parameters. Through the execution of this, a process is performed which attaches a mark to the areas to which the j-th variable points. Following this, the program moves to step (3-11).

On the other hand, for variables that are not designated as pointers (are designated as integers) by these pointers 222, the program moves to step (3-11) without conducting the process of attaching marks in step (3-10).

With conventional garbage collection technology, when a determination is made that there is a reference to the i-th area from the variable area of the application program and a mark is attached, a determination is made whether there is further reference to all of the variables in the i-th area. If there is such a reference, a mark is attached and it is impossible to recover one to which a mark has been attached. However, there are cases when recovery is good even if the data is pointed to by a pointer. For example, the table that manages objects that have been disk cached is such that the entries contained thereon contain pointers to objects, but it is possible to easily read the disk cache when this data is necessary. Consequently, no particular trouble is created if this is recovered once and reread as necessary even if the possibility of being referenced remains. Thus, with the present invention, by using the pointers 222 that are the management information which has been set to the object holder header 22 as described above, the process of attaching a mark to something being pointed at by a variable which has been designated to not be a pointer is not conducted, and consequently, recovery is possible.

When the variable j has a value which exceeds the number of variables in the i-th area, the process of attaching marks in the i-th area is concluded.

Figure 12:
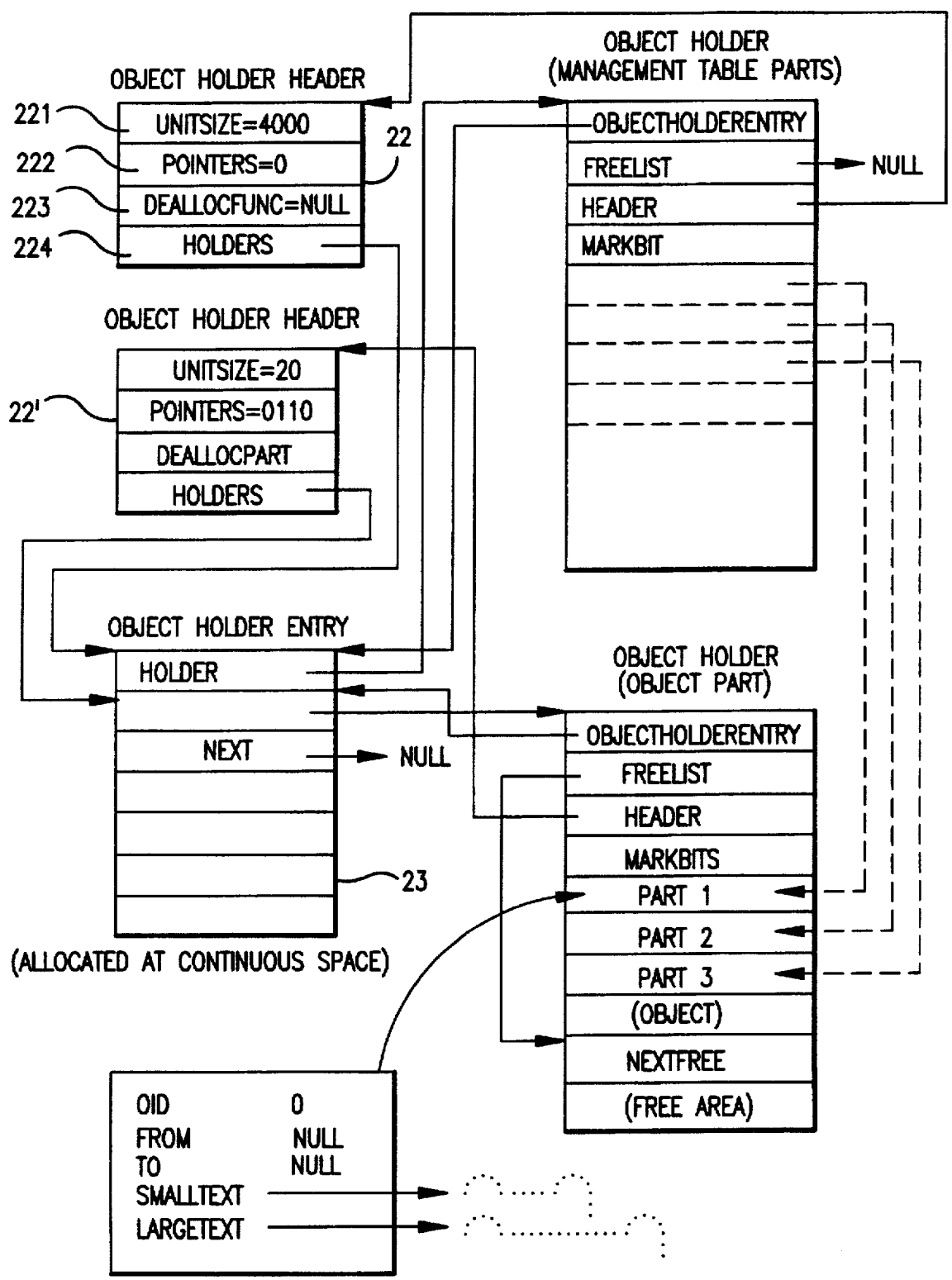
FIG. 12 is an example of data in the memory management space.

Next, an example of concrete data for the present embodiment will be described. FIG. 12 is an example where the application program creates an object and manages the object using object management tables by means of a memory management module. That is to say, the object management tables and the objects managed thereby are held in respective object holders and the data managed by these object management tables is managed by means of a memory management module 13 to be recoverable. The structure of the data in this example and the contents of the processes are shown in FIG. 3.

FIG. 12 shows the state where the object holder, object holder 21, which holds the object management table "Parts" that manages the object "part" defined in FIG. 3 and the header thereof, object holder header 22, the object holder, object holder 21, which holds the object "part" and the header thereof, object holder header 22, and the object holder entry 23 are allocated in the memory management space 112.

In the object holder header, object holder header 22 of the object management table, the size of the unit, unitSize 221 is 4000 bytes the pointer designation information, pointers 222, is 0, the procedure deallocFunc 223 which is called and executed during recovery is NULL and the holders 224 which designate the object holders are set.

In addition, in the object holder header 22', the size of the unit, unitSize, is 20 (5 4-byte variables), the pointer designation information, "pointers" is 01110, the process deallocFunc that is called and executed during recovery is the function deallocPart which is defined in FIG. 3 and the holders which designate the object holders are set.

The object management tables of the object holder 121 have a storage column for the pointers which are accessed by the object identifier and when a particular object is read into the memory management space 112, the header of the location which is stored in this object is registered in this column. For those cases in which an object does not exist in the memory management space 112, NULL is set in place of a pointer.

Because a 0 is designated in the column 1222 of the pointer designation information "pointers" of the object holder header 122 which is the management information of the object management table, during attaching of marks during data recovery, the pointers to the objects of the object management table are all considered invalid as reference destinations. That is to say, for objects that are referenced from the object management table, a determination is made whether these are pointers in step (3-9) of FIG. 11 and a mark is not attached when these are forcibly determined to not be pointers. At this point, if this were conventional garbage collection, data recovery would be impossible because the object which was once registered in the object management table is without fail referenced by the pointer in the object management table. However, in the present invention, through the pointer designation information, the pointer of the object management table is forcibly designated as a non-pointer. Through this, the object which is pointed to from this object management table can be recovered when there are not other references.

In addition, because NULL is designated in the column 1223 of the designation information deallocFunc of the process which the object holder header 122 corresponding to the object management table conducts at the time of recovered, no particular process is conducted through this management information.

Because 01110 is designated in the column 1222' of the pointer designation information "pointers" of the object holder header 122', during marking at the time of data recovery, the second, third and fourth variables among the variables of each object are all considered by be invalid as reference source. That is to say, for other objects which are referenced from the second, third and fourth variables among the variables of each object, in the determination of whether these are pointers in step 3-9 of FIG. 11, the determination is forcibly that these are not pointers so marks are not attached.

In addition, because the procedure deallocPart defined in FIG. 3 is designated in the column 1223' of the designation information deallocFunc that is a procedure that is conducted at the time of recovery by the object holder header 122' that is management information for the object holder 212', this procedure is called in step (2-12) of FIG. 9 when the area is recovered. In the execution of this procedure, the pointer (memory address) to the object which is registered in the entry of the object management table corresponding to the object identifier OID of the object that is recovered is set to NULL as indicated by the "void deallocPart{ }" part of FIG. 3. Through this, a process is conducted that deletes this from the object management table.

In addition, when an object which is not referenced from anywhere (i.e., does not have a mark attached) has a pointer to the object large_text which is in the area that is managed separate from the memory management space 112, the area of this large_text to which a pointer points is freed by the command "free." In addition, when in an area in which an object having no object identifier OID is managed separate from the memory management space 112, an object with no mark attached references this object having no OID, this referenced object having no OID is freed by the command "free."

As another example of data that is the target of the present embodiment, there is a case where files are treated. In this case, it is necessary to open the file when the object is read. Consequently, a procedure to open the file is contained in the process "load_part" which secures areas. Objects relating to the file can hold file information in the form of file identification numbers called file descriptors that are uniquely assigned.

When a file is opened, an area for managing is secured in the OS. When the file is left open, this area remains in the OS. When a particular object holds the file information as this file descriptor, if the object is not recovered in this form, the file descriptor will not understand and this file will remain open. When this happens, the resources of the OS are wastefully used. Consequently, it is necessary to close this file.

Hence, a command to close the file is included in the procedure "dealloc_part" which is called during recovery when the file data is treated in this way.

With the first embodiment as described above, the procedure "deallocFunc" that is designated in the object holder when the area is secured is called in step (2-12) when the area is recovered. Consequently, it is possible to free resources and other areas which this area references.

In addition, it is possible to designate that pointers do not exist in this area when securing the area. Consequently, it is possible, even when a reference by a pointer is actually included, to automatically recover the destination of this reference while no longer referencing through the function called at the time of recovery.

Through this, it is possible to easily create a program with good memory utilization efficiency.

Second Embodiment

FIGS. 13 through 18 show a second embodiment of the present invention.

Figure 13:
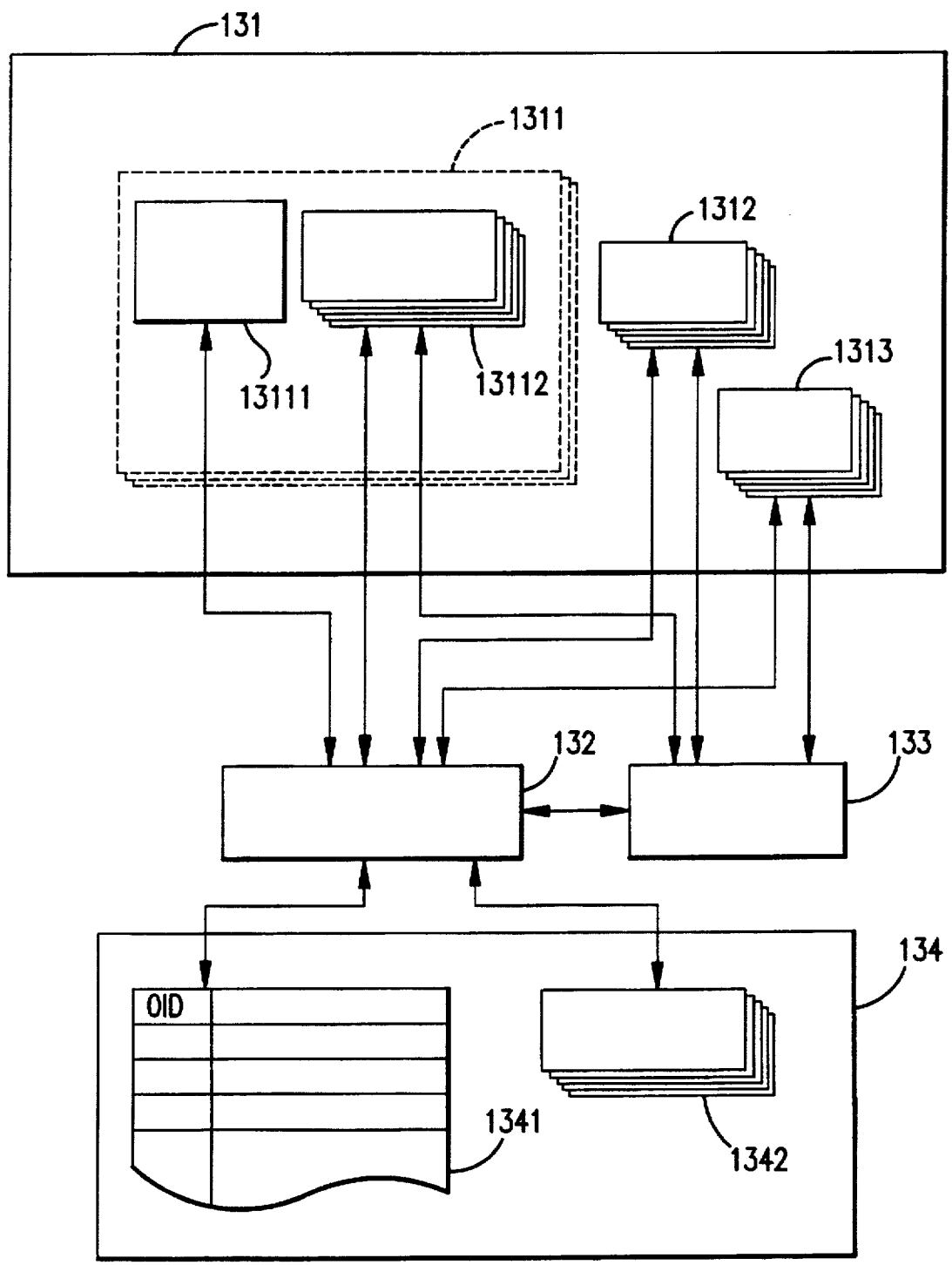
FIG. 13 is a function block diagram for a system containing an object-oriented database and the function of that application program for executing an objecting managing method according to a second embodiment of the present invention.

FIG. 13 is a function block of an object-oriented database management system suitable for the object managing method of the present invention. In this figure, the secondary memory apparatus 134 stores the permanent objects 1342 and the object table 1341. A logical identifier OID is attached to each permanent object 1342 and references between permanent objects are expressed through identifiers OID. In the object table 1341, sets of an identifier OID and the storage location (DiskAddress) of the permanent object to which this identifier OID is attached are stored. The main memory apparatus 131 is used to read and temporarily store the permanent objects 1342 stored by the secondary memory apparatus 134. Furthermore, the global variables 3121 and local variables 313 are also stored in the main memory apparatus 131 as the execution environment of the application program.

The permanent object management module 132 performs processes such as management of the object tables 1341 and object table cache 13111, creation of the permanent object handler 13112 that uses the object table cache 13111 and changing of permanent objects. These processes can be performed using commonly known conventional methods such as those explained in the aforementioned Japanese Laid-Open Patent Publication Hei 5-225034. In addition to this, the permanent object management module 132 performs the processes of recovering and recycling the areas of the permanent object handler that are not referenced from the application program.

Figure 14:
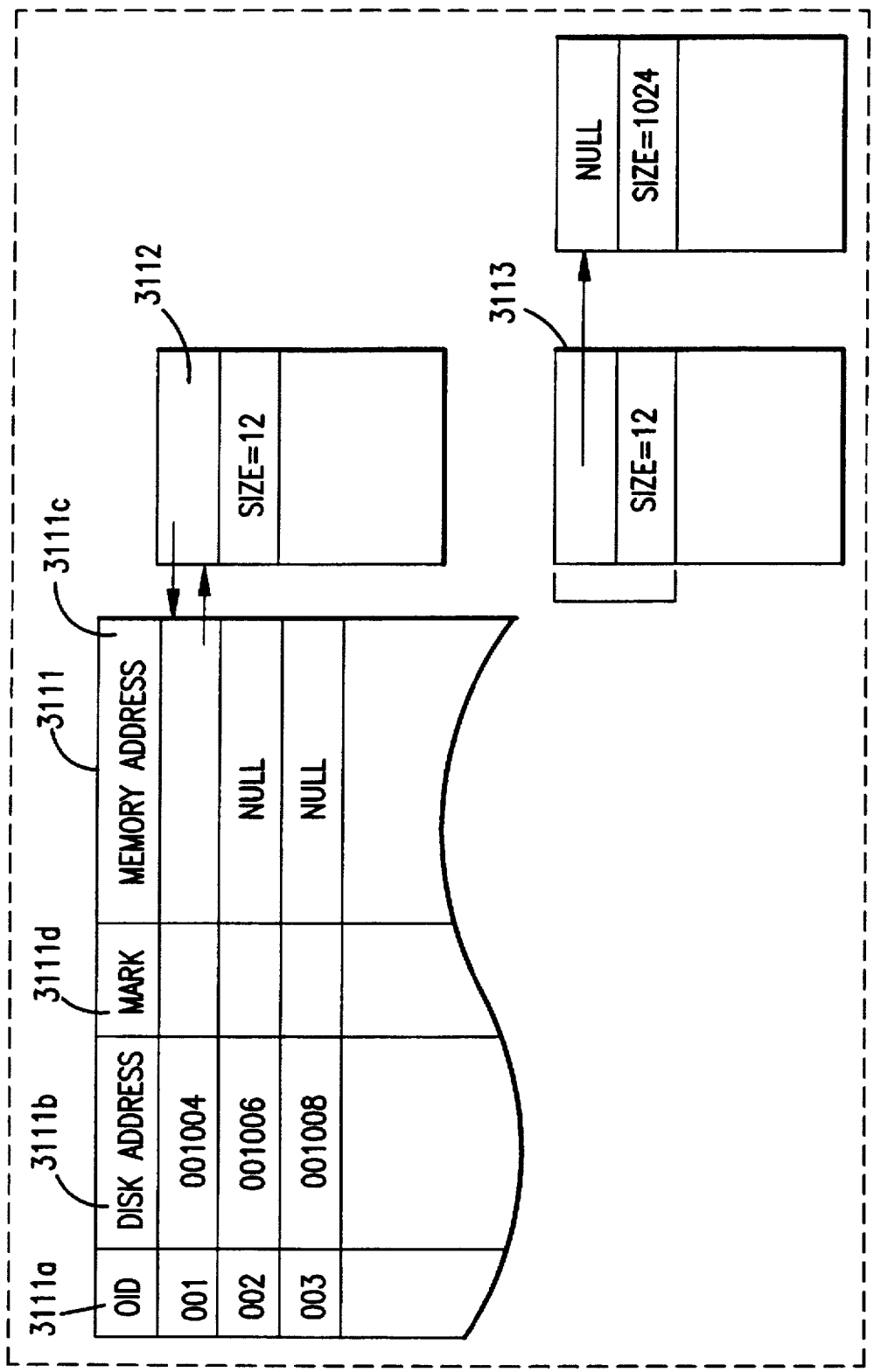
FIG. 14 is a drawing showing the structure of the cache in the second embodiment.

FIG. 14 is a diagram showing the detailed structure of the cache 1311 in FIG. 13. In this figure, the object table cache 13111 has an OID column 13111a as the contents of the object table 1341 which is stored in the secondary memory apparatus 134, a Disk Address column 13111b, a column 13111c for the pointer "Memory Address" which points to the permanent object handler 13112 and a mark column 13111d that stores the marks used to examine whether this permanent object handler 13112 is referenced from the application program.

The permanent object handler 13112 is used to hold the contents of the permanent object temporarily in the cache in order to conduct high speed referencing and changing of these contents. In addition, the permanent object handler 13112 holds the pointer which points to the entry of the object table cache 13111 which holds information such as the identifier OID of this permanent object.

The empty area list 13113 is used to hold the areas that can be used as areas for the permanent object handler. The empty area list 13113 holds the areas which become unused in the cache by attaching these to the top of the list.

Figure 15:
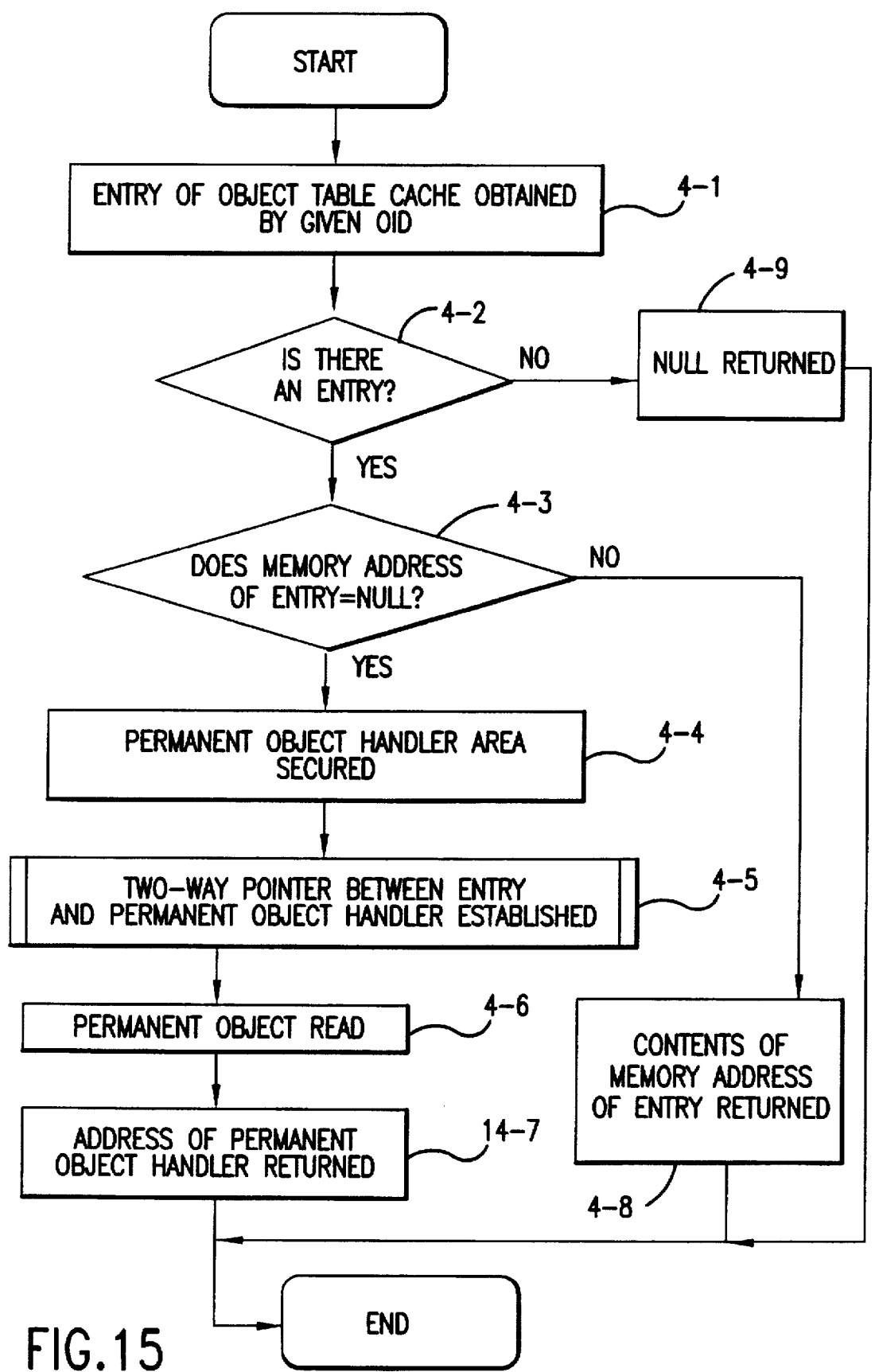
FIG. 15 is a flowchart showing the operation of a process for creating permanent object handlers in the second embodiment.

FIG. 15 shows the flow of the process for creating the permanent object handler in the permanent object management module 132.

In step (4-1), an entry holding the same identifier OID as the identifier OID that has been given is found from the midst of the object table cache 13111.

In step (4-2), verification is made whether there is no entry. If there is no entry, NULL is returned in step (4-9). If there is an entry, verification is made in step (4-3) whether the column 13111 for the Memory Address of this entry is NULL. If this is not NULL, the value of this Memory Address column 13111 is returned to the application program in step (4-8).

If the Memory Address column 13111c of the object table cache 13111 is NULL, an area for a new permanent object handler is secured in step (4-4). In step (4-5), a two-direction pointer to the entry and the permanent object handler is set. That is to say, the address of the newly secured permanent object handler is set in the Memory Address column 13111c of the entry and the address to the entry is set in the top area 13112 of the permanent object handler.

In step (4-6), the contents of the permanent object are read to the permanent object handler 13112 and in step (4-7) the address of the permanent object handler is returned.

Figure 16:
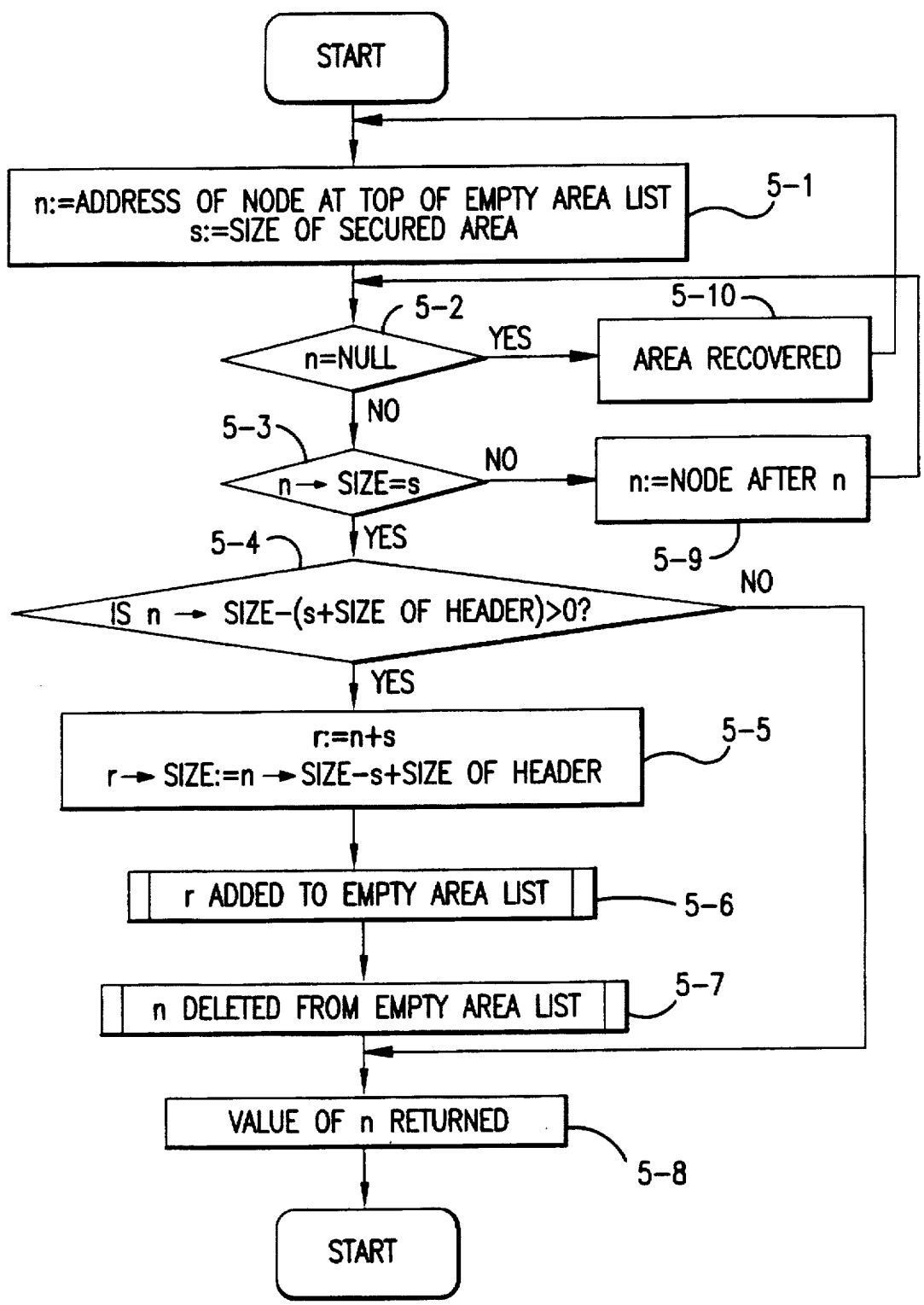
FIG. 16 is a flowchart showing the operation of a process for securing permanent object handler areas in the second embodiment.

FIG. 16 shows the flow of the process (step 4-4 in FIG. 15) that secures the area for the permanent object handler in the permanent object management module 331.

In step (5-1), the top address in the empty area list is substituted into the variable n and the size of the area to be secured is substituted into the variable s.

In step (5-2), verification is made whether the variable n is NULL. When the variable n is NULL, either all of the areas are in use or there is not sufficient size in the unused areas. At this time, the process of recovering areas in step (5-10) is conducted and the process is performed again from the start.

When the variable n is not NULL in step (5-2), verification is made whether the size "size" of the area to which n points is larger than s. When the size ("size") of n is smaller than s, in step (5-9) the address of the node following n is substituted into n and the program returns to step (5-2).

When the size of n in step (5-3) is at least as large as s, further verification is made whether the value obtained by subtracting from the size of n the sum of s and the size of the header of the nodes in the empty area list is larger than 0. When the result of the verification in step (5-4) is yes, in step (5-5) the node to which n points is divided into an area the size of s and a remaining area. In step (5-6) the remaining area is added to the empty area list. In step (5-7), n is deleted from the empty area list. In step (5-8), n is returned as the area that has been secured.

Figure 17:
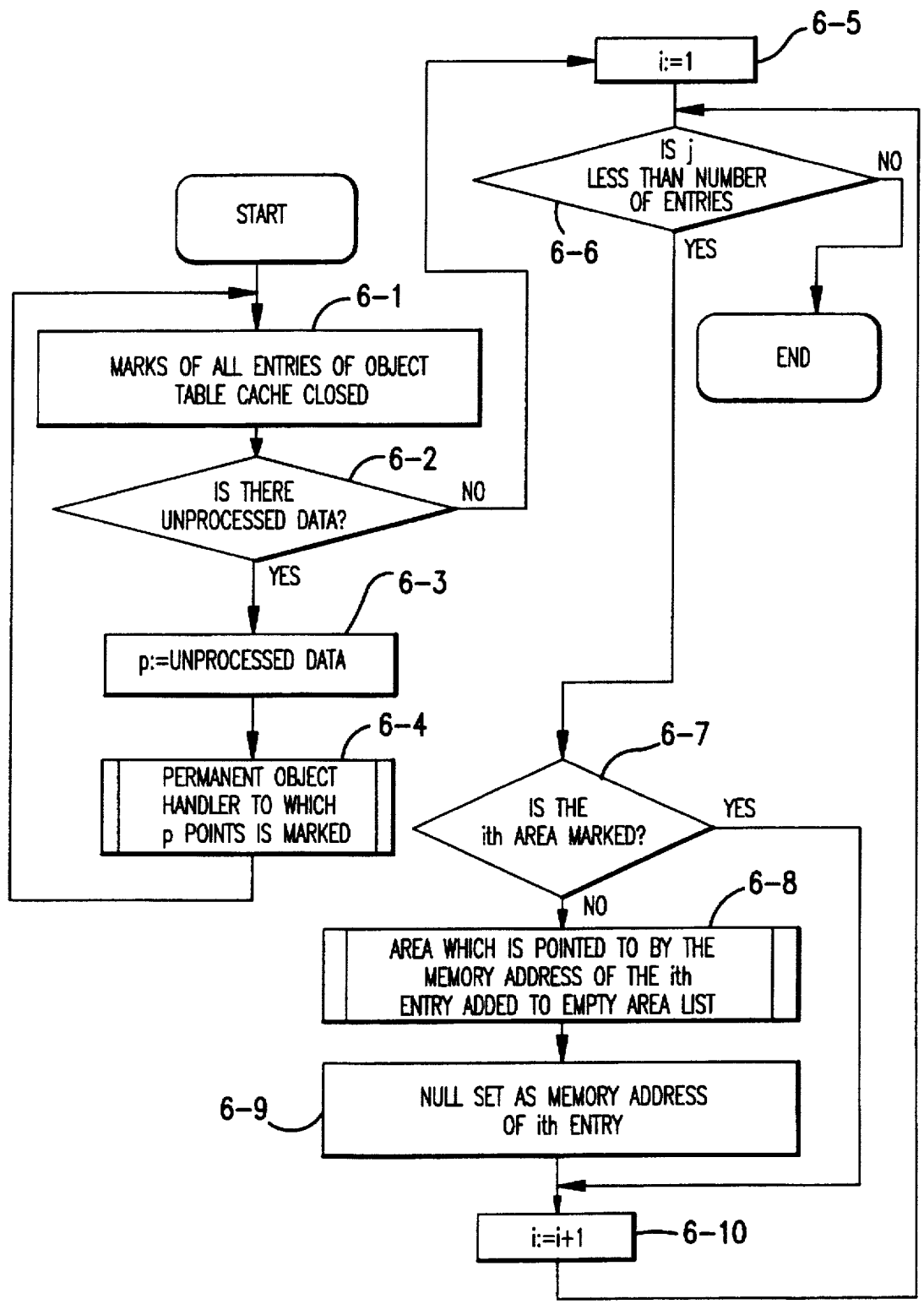
FIG. 17 is a flowchart showing the operation of a process for recovering permanent object handler areas in the second embodiment.

FIG. 17 shows the procedure (the detailed process of step (2-10) in FIG. 16) in which the permanent object management module 132 recovers the area.

In step (6-1), the marks "mark" of all of the entries of the object table cache 13111 are cleared.

Next, from step (6-2) to step (6-4), all of the data stored in the global variables and the local variables in the application program is extracted and a process which attaches marks to this data is called. The contents of the global variables and the local variables of the application program can be extracted from data areas and stacks and registers when this program is run under a general operating system such as UNIX or the like.

When a determination is made that the process of attaching marks to all of the data in step (6-2) has been concluded, the program moves to step (6-5).

From step (6-5) to step (6-10), a process of recovering areas is conducted for all of the entries of the object table cache.

In step (6-7), a determination is made whether a mark has been attached to the i-th entry.

If a mark has been attached, this area is not recovered. Consequently, in step (6-10), i is incremented by 1, the program returns to step (6-6) and the process of recovering the next area is conducted.

If a mark has not been attached, in step (6-8) the area pointed to by the Memory Address of that entry is added to the empty area list B1. Through this, this area becomes usable the next time areas are secured.

Next, in step (6-9), the Memory Address of the i-th entry is set to NULL. Through this, this area can be secured again through step (4-4) in FIG. 15 if a reference to the permanent object corresponding to this entry becomes necessary. When a determination is made that the process of recovering all of the entries of the object table cache in step (6-6) has been concluded, the entire process is concluded.

Figure 18:
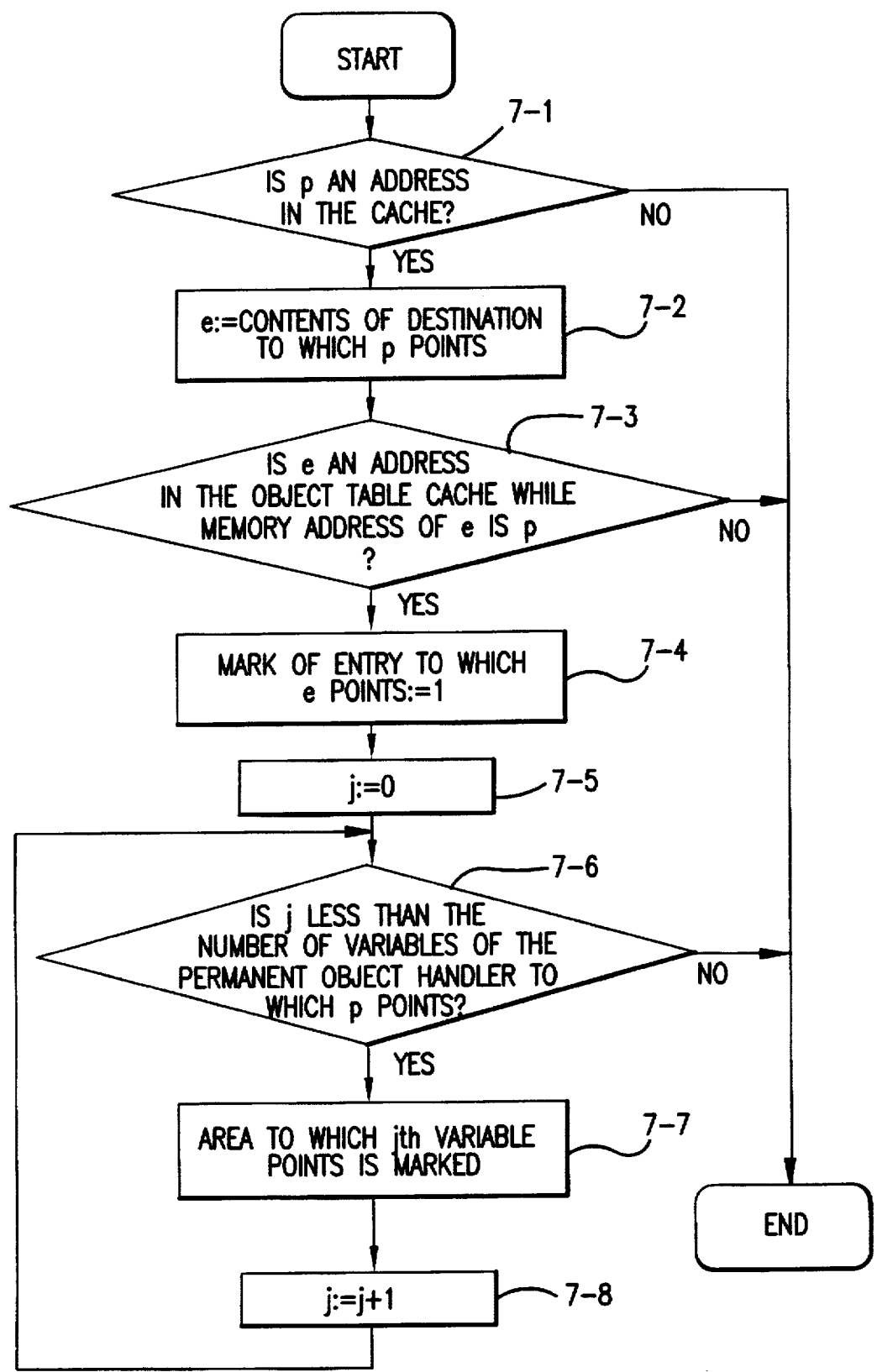
FIG. 18 is a flowchart showing the operation of a process for attaching marks to permanent object handler areas in the second embodiment.

FIG. 18 shows the procedure for attaching marks to the permanent object handler which is called in step (6-4) of FIG. 17.

In step (7-1), first verification is made whether the data p that has been provided is an address inside the cache. If p is not an address inside the cache, this process terminates here.

If p is an address inside the cache, in step (7-2) the contents of the location to which p points are substituted into the variable e. In step (7-3), verification is made whether the variable e is an address inside the object table cache while the value of the Memory Address of the entry to which the variable e points is p. If the result of step (7-3) is yes, p points to a permanent object handler that is being used and is considered to be referenced directly or indirectly from the application program. Hence, if the result of step (7-3) is yes, the mark of this entry is set to 1 in step (7-4). Following this, in step (7-5) through step (7-8), marks are attached to the areas that are pointed to by data in the area to which p points.

In the process of securing areas of the permanent object handler, when there are not sufficient empty areas, areas of the permanent object handler which are not referenced from the application program can be recovered and recycled. Consequently, it is possible to limit the size of the cache and to enable the application program to run even with limited memory resources.

Third Embodiment

Figure 19:
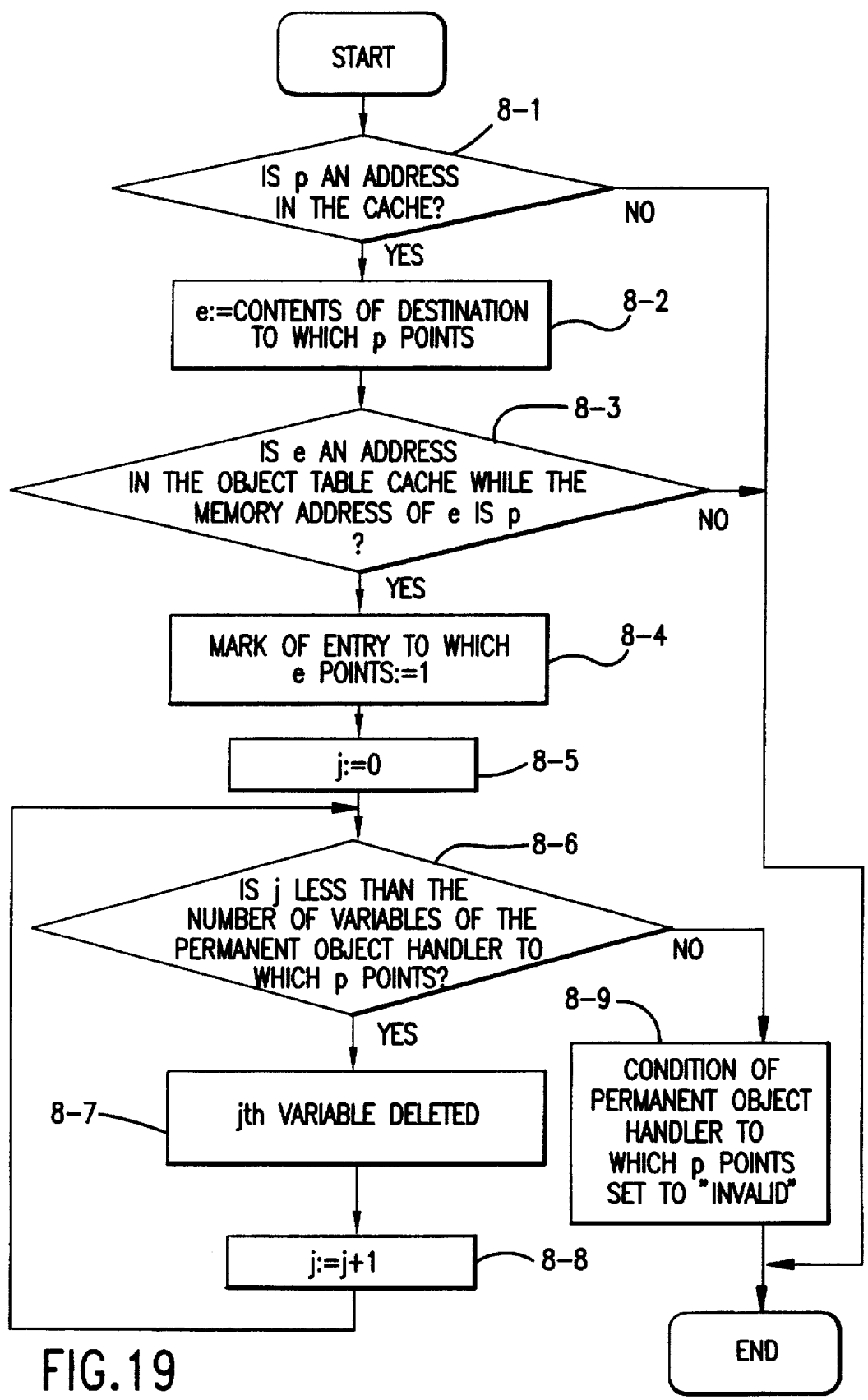
FIG. 19 is a flowchart showing the operation of a process for attaching marks to permanent object handler areas in a third embodiment.

With the procedure for attaching marks to the permanent object handler shown in FIG. 18, marks are also attached to permanent object handlers that are references from marked permanent object handlers. However, the contents of data which the permanent object handler secures is data read from data stored in the secondary memory apparatus. Consequently, it is possible to restore this by rereading the contents as necessary even if the contents have been deleted. In FIG. 19, an embodiment is shown where the contents of the permanent object handler are deleted in the process of attaching marks to the permanent object handler. Step (8-1) through step (8-5) are the same as step (7-1) through step (7-5) in FIG. 18. The big difference from FIG. 18 is that the contents of the variable are deleted in step (8-7) and that the state of the permanent object handler is set to "invalid" in step (8-7). The process of restoring the contents of the permanent object handler whose state is set to "invalid" can be conducted through the method noted in FIG. 12 of the aforementioned Japanese Laid-Open Patent Publication Hei 5-225034. That is to say, a graph expressing information about the state that the permanent object handler is found. When this state is invalid, the permanent object is read from the secondary memory apparatus and the graph is changed to information indicating a valid state.

With this embodiment, a mark is attached to the permanent object handler that is referenced only from the permanent object handler. Consequently, that area can be recovered through the process of FIG. 17. Hence, the utilization efficiency of the memory is increased because the recovery rate of areas is increased.

Fourth Embodiment

Figure 20:
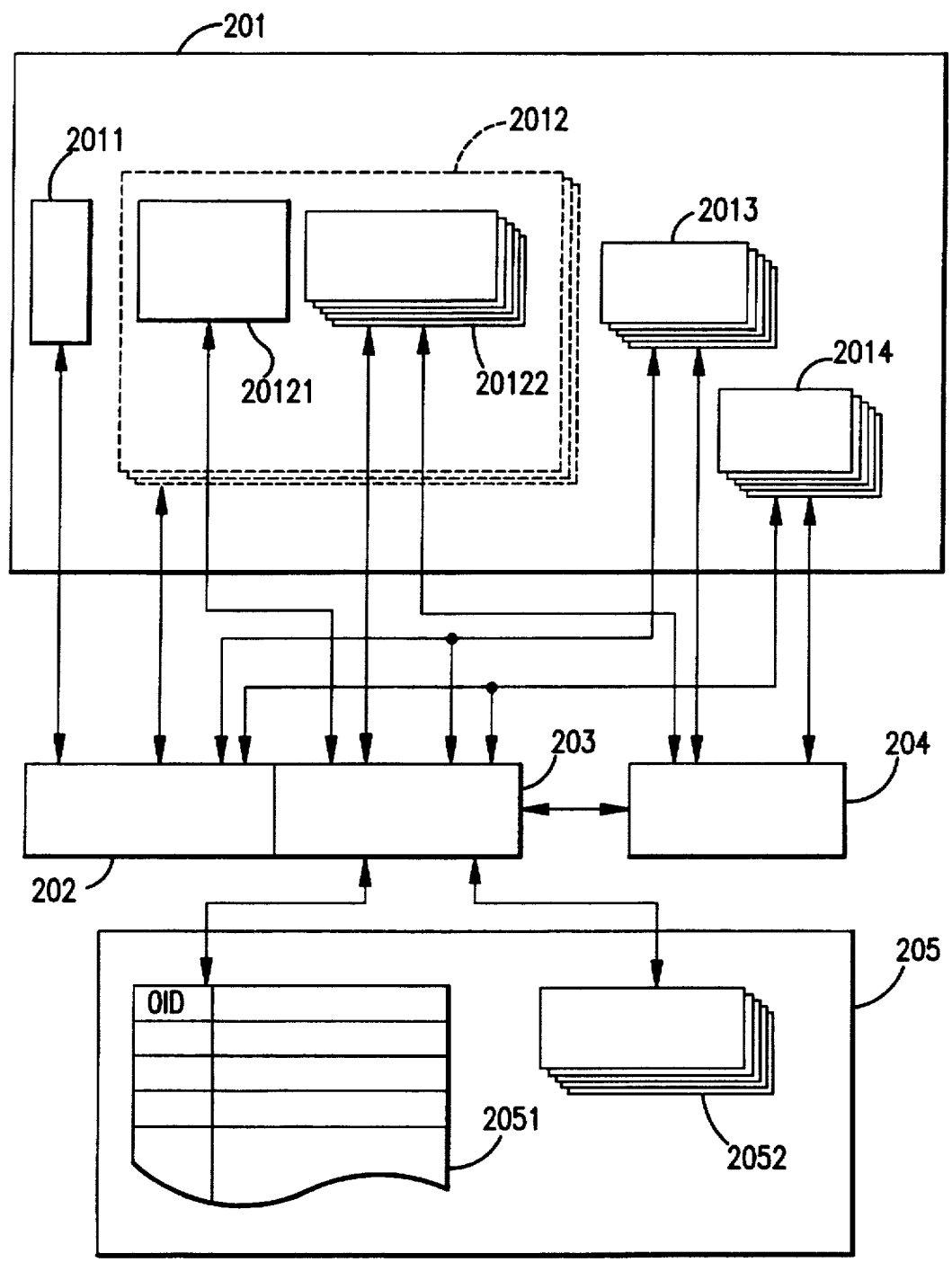
FIG. 20 is a function block diagram of the system used to execute the memory managing method of a fourth embodiment of the present invention.

The present embodiment is an embodiment that enables the recovery of cache areas of an object-oriented database management system that uses permanent objects in a secondary memory apparatus such as is noted in Japanese Laid-Open 5-225034 and management tables by reading such into the memory management space as shown in FIG. 20. The basic structure is the same as the first embodiment with the differences being that a permanent object management module 203 and a secondary memory apparatus 205 to store these permanent objects have been added. Recovery of the cache areas uses a procedure similar to the garbage collection by the memory management module 12 of the first embodiment. The access method that uses the cache to the permanent object 20122 from the application program 204 is similar to the permanent object management module of the second embodiment. The second embodiment is such that the permanent object management module has a function for recovering the cache area. However, with the permanent object management module 203 of the present embodiment, this function has been deleted and the recovery method through the memory management module of the first embodiment is used.

Figure 21:
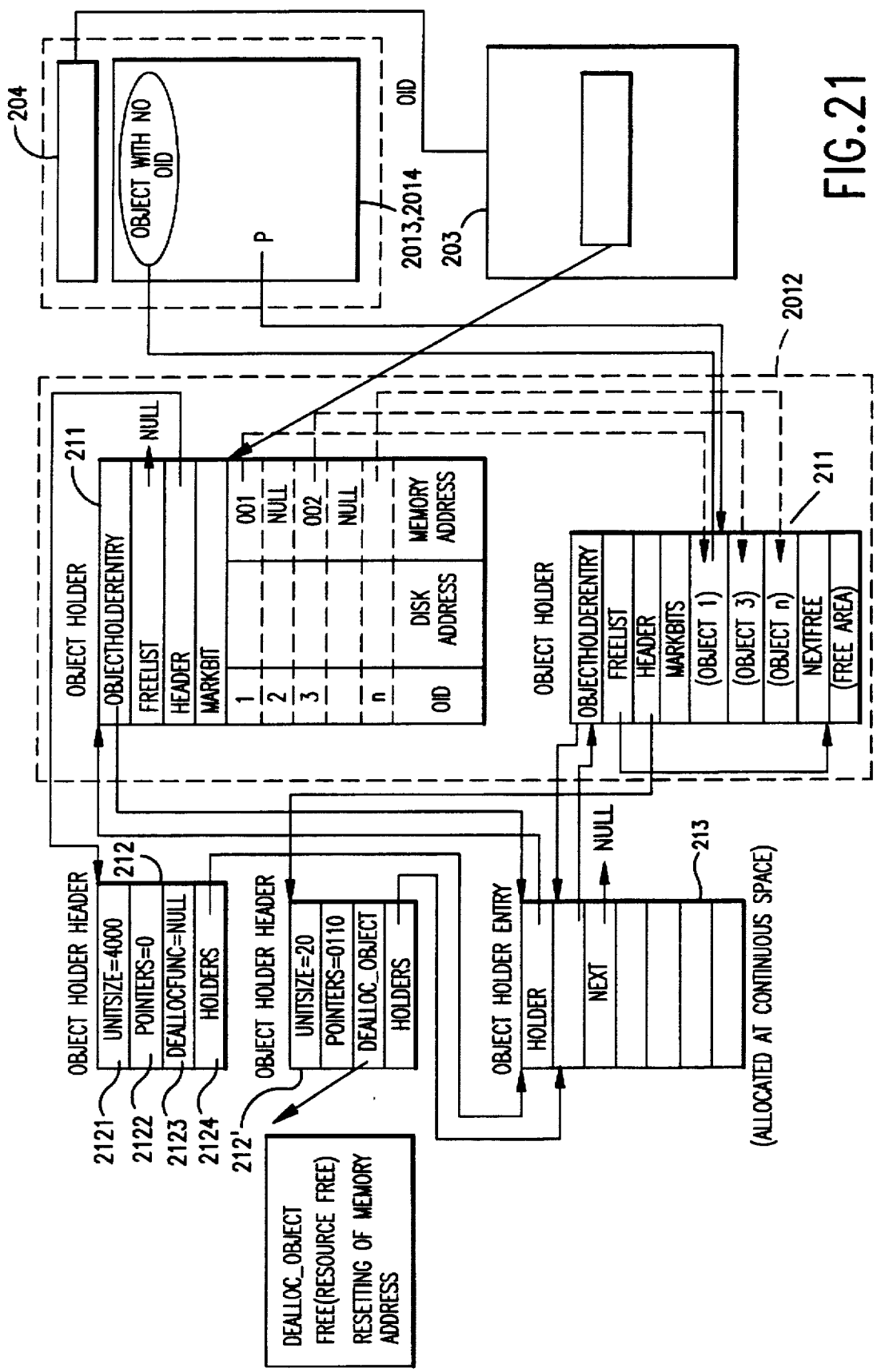
FIG. 21 is a diagram showing the structure of the memory space in the fourth embodiment.

FIG. 21 shows the data structure of the memory space of the present embodiment. Here, the permanent object 20122 and the object table cache 20121 that manages registering and deleting of the permanent objects which have been read from the secondary memory apparatus 205 exist as objects. Similar to the first embodiment, these objects have a structure that is held in the areas of the object holders 211 and 211'. The object holder headers 212 and 212' exist as management information corresponding to these object holders. The setting of the information of the object holder headers 212 and 212' is the same example as shown in FIG. 12.

The object table cache 20121 has the same structure as the object table in Japanese Laid-Open 5-225034, and has entries that hold three properties of each object, that is to say, the object identifier (OID), the position (Disk Address) of the permanent object in the secondary memory apparatus and the position (Memory Address) of the permanent object in the main memory apparatus so that these three correspond to each other. This is the same as omitting the item "mark" from the object management table of the second embodiment.

Figure 5:
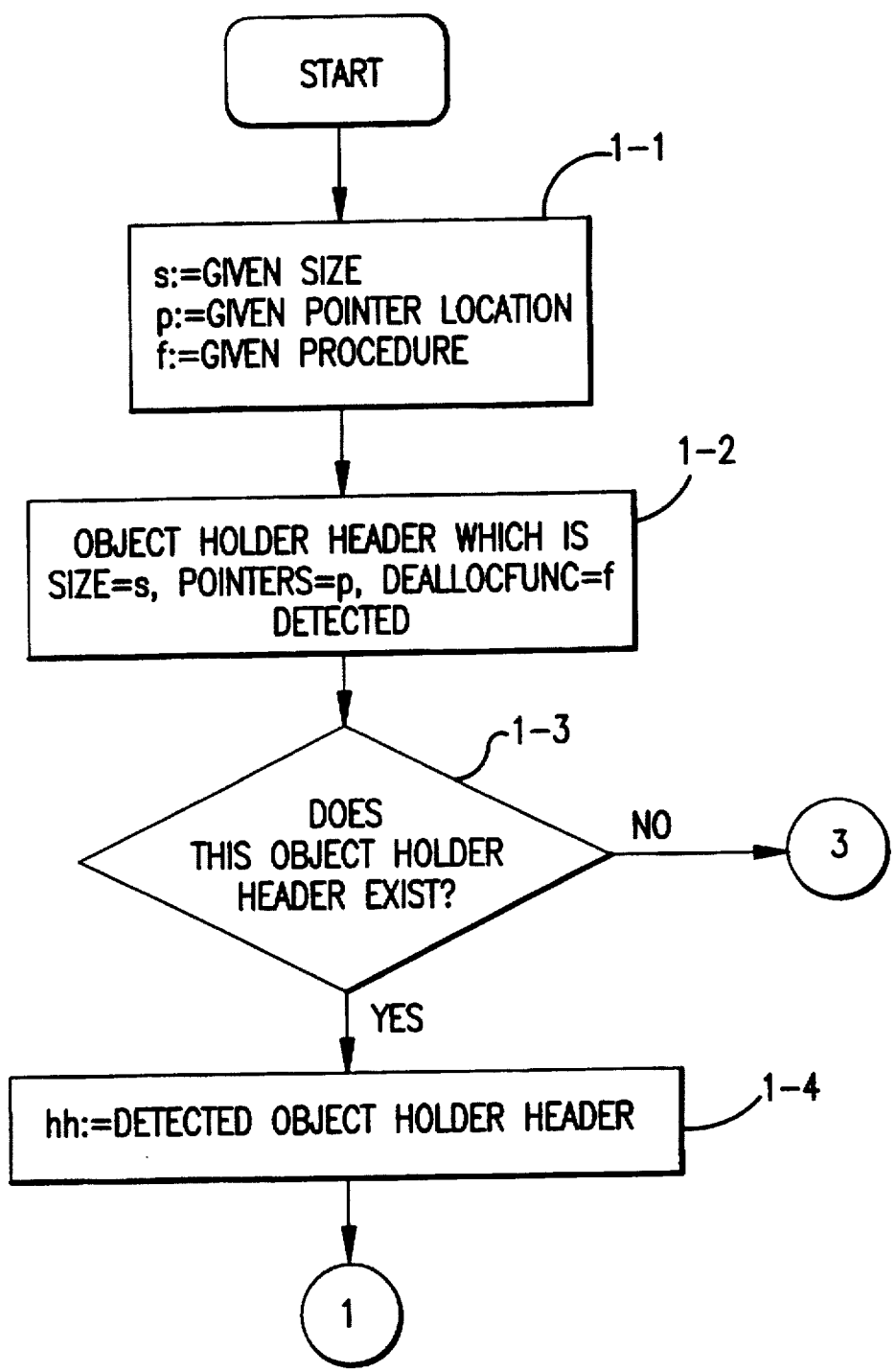
FIG. 5 is a flowchart (part 1) showing the operation of a process for securing areas in the first embodiment.
Figure 6:
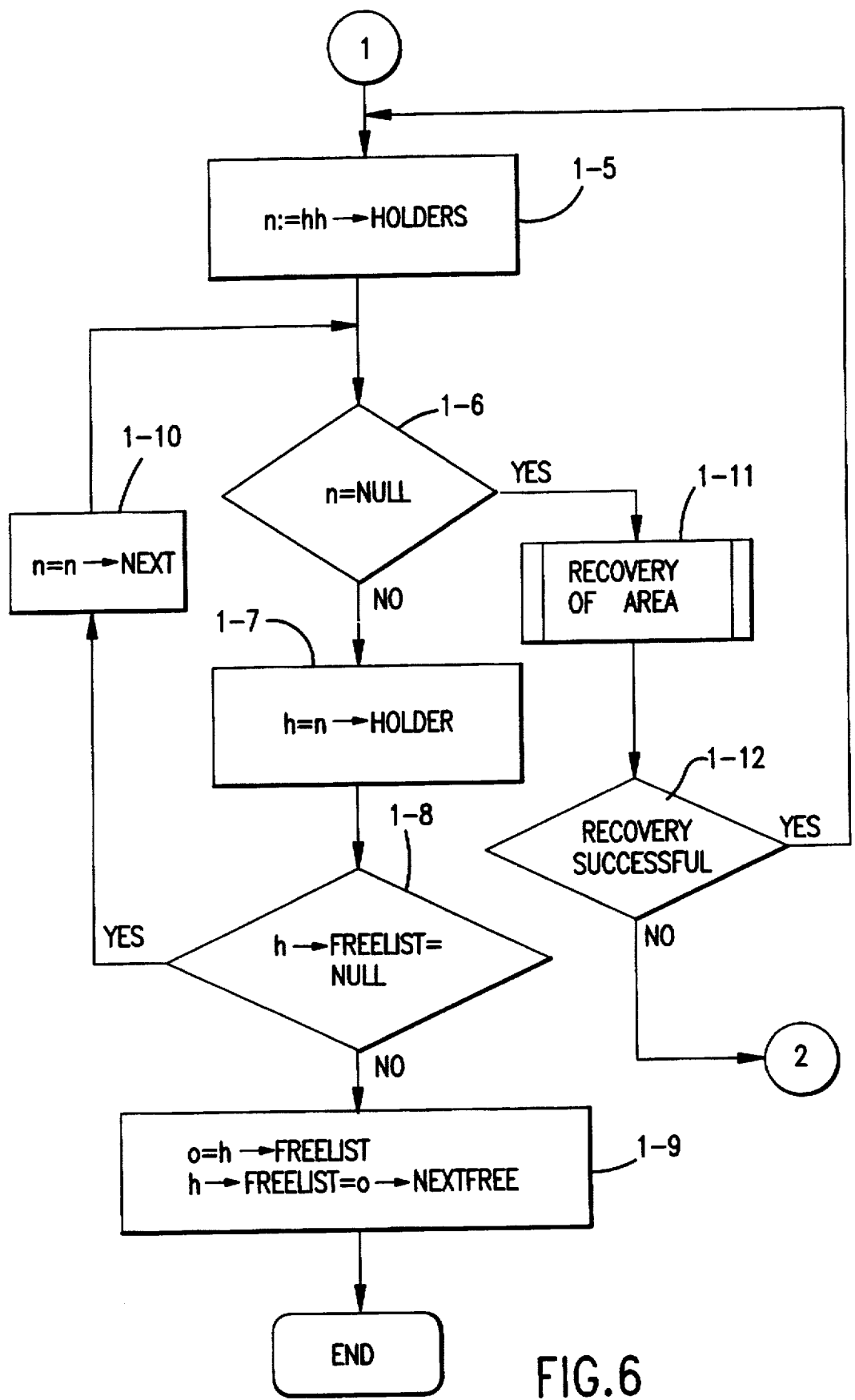
FIG. 6 is a flowchart (part 2) showing the operation of a process for securing areas in the first embodiment.

The creation within the areas of the memory management space 2012 of the main memory apparatus for each object holder for the object table cache 20121 and the permanent object 20122 that are requested from the application program 204 is conducted through the memory management module 202 by the procedure "allocate_object" shown in FIGS. 5 and 6 of the first embodiment.

Figure 22:
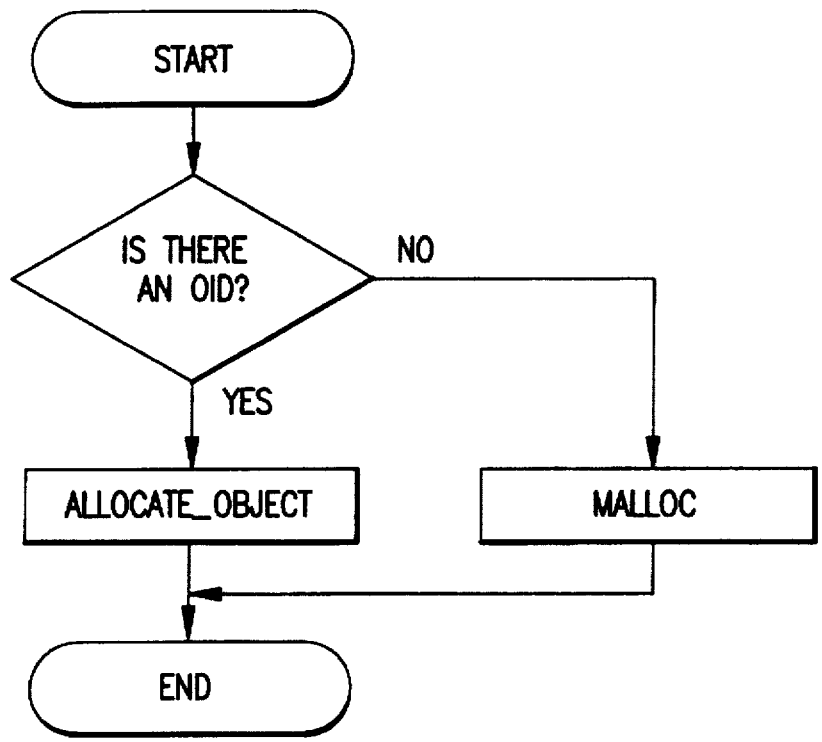
FIG. 22 is a drawing explaining the differences in the securing methods through differences in the objects when securing memory areas.
Figure 23:
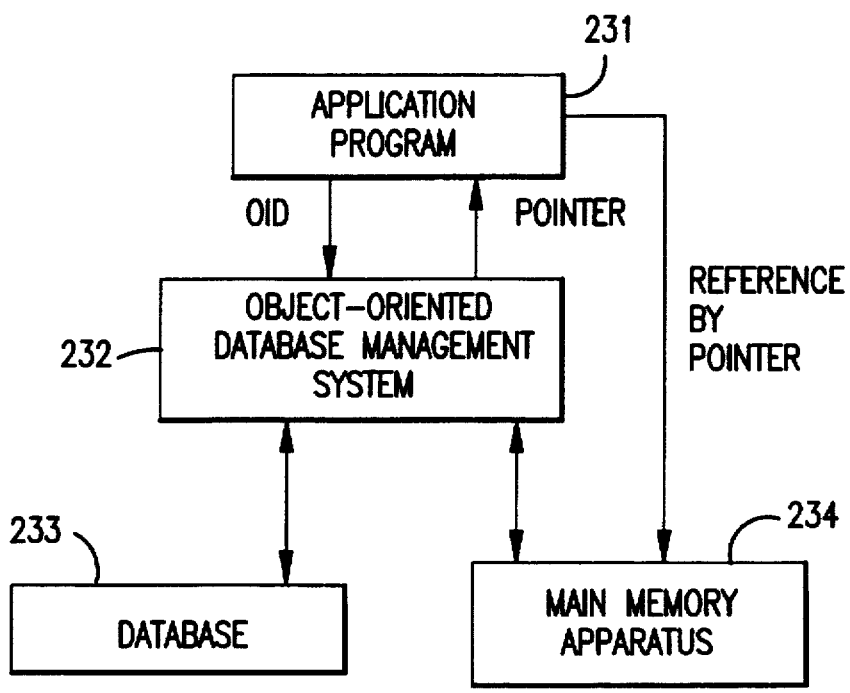
FIG. 23 is a drawing showing the method of utilizing data from the application program in an object-oriented database management system.

When the application program does not require data that holds the object identifier OID, the memory management space 2012 is assigned to a separate area 2013 by the command "malloc." FIG. 22 shows this relationship.

In the second embodiment, the process of creating the permanent object handler in FIG. 15 and the process of securing areas for the permanent object handler in FIG. 16 are processes that are also common to the permanent object management module 203 in the fourth embodiment.

When the application program 204 accesses the permanent object, the object identifier OID of the permanent object is passed to the permanent object management module 203. In accordance with this, the permanent object management module 203 searches the object table cache using this object identifier OID that has been passed, specifies an entry having the same OID and determines whether the position "Memory address" of the corresponding permanent object handler in the main memory apparatus is registered. If this is registered, this position information "Memory address" is returned to the application program. This process is the same as the process conducted by steps (4-1), (4-2), (4-3) and (4-8) of the flowchart in FIG. 15 for the second embodiment.

The application program can obtain the permanent object held in the permanent object holder of the cache area in the main memory address through the position information "Memory address" obtained in this manner.

Figure 7:
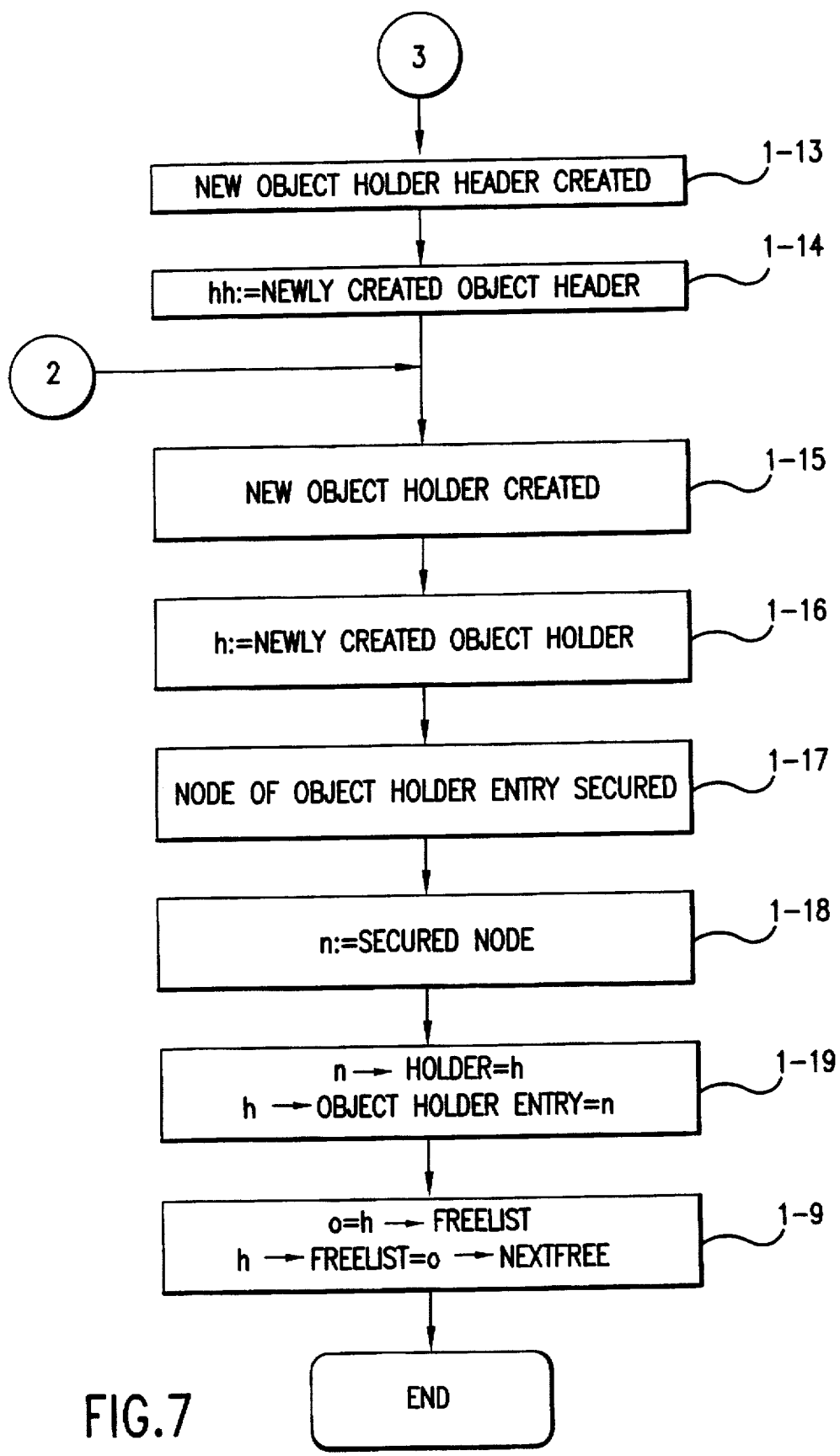
FIG. 7 is a flowchart (part 3) showing the operation of a process for securing areas in the first embodiment.

When the permanent object requested by the application program is not in the cache area, that is to say, when the Memory address of the entry in the object table cache 20121 in step (4-3) is NULL, the area for the permanent object is secured through a process similar to the process shown in the flowcharts of FIG. 5 to 7 that were explained above in the first embodiment. In addition, the recovery of areas in step (1-11) is conducted through a process that is indicated by the flowcharts in FIGS. 8 through 11 of the first embodiment. A procedure that resets the Memory address corresponding to the object table cache 20121, that is to say, sets this to NULL, is designated as the process called when areas are recovered.

Similar to the first embodiment, when objects that are not referenced from anywhere, that is to say have no marks attached, have pointers to the object "large_text" which is in areas 2013 and 2014 that are managed separate from the cache area 2012 of the memory management space, the area of this "large_text" pointed to by these pointers is freed by the command "free." In addition, when an object having no object identifier OID is similarly in the areas 2013 and 2014 that are managed separate from the memory management space 2012 and objects without marks attached reference these objects without OIDs, these objects which have no OIDs and are referenced are freed by the command "free." A step for this purpose is inserted into the procedure "deallocFunc" that is called during recovery.

In this way, the procedure "deallocFunc" that is designated in the object holder header at the time of securing areas is called in step (2-12) of FIG. 9 when recovery areas. Consequently, it is possible to free resources and areas other than those referenced by this area and in addition is it possible to renew the object table cache.

The memory managing method of the present invention stores the locations in the data areas where pointers are contained corresponding to each data area that is a target of management and examines as reference bases only locations where it has been designated that pointers are contained in each data area that is the target of management in determining whether there is a reference to a particular data area. Consequently, it is possible to automatically recover even data areas that are referenced from other data areas.

In addition, with the memory managing method of the present invention, the address of a procedure is attached corresponding to each data area that is the target of management. When it is determined that there are no references to a particular data area, the procedure corresponding to this data area can be called and executed when this data area is recovered. Consequently, it is possible to set processes that differ depending on the data area being recovered. It is also possible to conduct appropriately valid processes relating to recovery such as freeing resources relating to this data area and renewing the management information.

In addition, the object managing method of the present invention implements a method determining recoverable areas in the cache area by finding whether the permanent objects in the main memory apparatus are referenced directly or indirectly from the global variables and local variables of the application program in an object-oriented database management system that introduces to the main memory apparatus permanent objects stored in the secondary memory apparatus. Consequently, recovery and recycle of areas that was not possible with conventional technology become possible.

In addition, the object managing method of the present invention designates all of the pointers to permanent objects in the management table as non-pointer information in an object-oriented database management system that uses permanent objects stored in the secondary memory apparatus by caching these objects in the main memory apparatus. Consequently, all of the pointers in the management table are considered to be invalid as reference destinations in examining whether there are references for purposes of recovery. Accordingly, recovery of cache areas that was not possible with conventional memory area recovery methods becomes possible. In addition, the procedure that is called during recovery contains a process for setting the pointer (memory address) of the management table corresponding to the permanent object being recovered to NULL. Consequently, it is also possible to renew the management table accompanying recovery.

While the invention has been described in relation to preferred embodiments, many modifications and variations are apparent from the description of the invention. All such modifications and variations are intended to be within the scope of the present invention as defined in the appended claims.

What is claimed is:

1. A memory management apparatus that recovers a data area that is not pointed to by an original pointer as an empty data area from data areas where data is recorded in the main memory, comprising:

data area management information memory for storing data area management information managing at least one of the data areas and including pointer information designating whether data that has been recorded in each data area managed by the data area management information is a pointer or not, regardless of whether the data that has been recorded in the data area is the original pointer; and memory manager, when retrieving empty data areas, for recognizing data that has been recorded in data areas that are designated as pointers by the pointer information contained in the data area management information as pointers.

2. The memory managing apparatus of claim 1, wherein the data area management information includes an address information of a procedure that is called when recovering data area managed by the data area management information as an empty data area; and wherein when recovering the data areas as an empty data area, said memory manager calls and executes the procedure in reference to the address information included in the data area management information that manages the data areas.

3. The memory managing apparatus of claim 2, wherein the data of the data areas that are recovered is a file descriptor that indicates the management information of the file, the procedure is one that closes the file, and when recovering the data area of the file descriptor, the procedure that closes the file is read and executed through the address information.

4. The memory managing apparatus of claim 2, wherein the procedure that is called when recovering a data area conducts a process that frees this data area expressly when the data area that is recovered is a reference to another data area.

5. The memory managing apparatus of claim 1, wherein data that is recorded in the data area includes an object that is the target that is referenced from the application program and a management table having at least a pointer to the object, said management table managing the object, the pointer information that is contained in the data area management information that manages the data area on which the management table has been recorded designates that all of the pointers to the objects contained in the management table are not pointers.

6. An object managing method of the type in an object-oriented database management system that manages by reading a permanent object from a secondary memory apparatus and recording the permanent object in a cache area of the main memory apparatus, wherein a variable area, on which the application program records values containing a reference address of the permanent object area in the cache area, is provided in a main memory apparatus and when reference is not made at least from the variable area to the area of each permanent object in the cache area, the area of the permanent object is recovered as an empty data area.

7. The object managing method of claim 6, wherein when the area of the permanent object in the cache area is created, information indicating the correspondence relationship of the identifier of the permanent objects, the storage address in the secondary memory apparatus and the recording address in the cache area is recorded as management information of the permanent object area, and information indicating the identifier of the corresponding permanent objects or the memory location of each corresponding memory address is recorded in the permanent object area that the memory address indicates.

8. An object managing method of the type in an object-oriented database management system that manages by reading a permanent object from a secondary memory apparatus and holding the permanent object in a cache area of the main memory apparatus, the cache area including a permanent object management table that has entries that cause a correspondence among the identifier of the permanent objects, the storage address in the secondary memory apparatus, pointers to the permanent object handlers in the cache area and marks indicating the absence or presence of reference from the application program to the permanent objects at this memory address, and a permanent object handler that has a pointer to the area corresponding to the permanent object management table, and holds the permanent object that has been read from the secondary memory apparatus, in the permanent object recovery process, when all of the data that the application program holds is considered to be pointers, permanent object handlers pointed to by this are found, and permanent object handlers found through this are mutually referenced to one of the areas of the permanent object management table, the permanent object of this permanent object handler is determined to have a reference from the application program, the results of this determination are set as the aforementioned marks for the corresponding areas, and a permanent object that was not determined to have a reference from the application program based on this mark that has been set is recovered.

9. An object managing method of the type in an object-oriented database management system that manages by reading a permanent object from a secondary memory apparatus and holding the permanent object in a cache area of a main memory apparatus, the main memory apparatus including a variable area, on which the application program holds values containing the reference address of the permanent object area of the cache area, wherein when the recovery process of the cache area is conducted, in each permanent object area in the cache area, for the permanent object area that is referenced from the variable area, the contents are deleted while invalid is assigned as the condition information, and for the area of the permanent object that is excluded from the permanent object area that is at least referenced from the variable area, this area is recovered and is recycled as a new permanent object area.

10. A memory managing method for an object-oriented database management system that manages permanent objects by recording in a cache area of a main memory apparatus the permanent object that has been read from the secondary memory apparatus and the management table that manages access corresponding to this permanent object, while recording in the main memory apparatus, outside the cache area, management information that is used to secure the cache area for the permanent object and the management table and to conduct recovery, wherein the management table holds information that establishes a correspondence among identifier of the permanent object, the storage address of the permanent object in the secondary memory apparatus, and the pointer to the permanent object in the cache area, the management information has non-pointer information that is considered to be invalid as the reference basis in the examination of the absence or presence of reference for recovery, and address information for the procedure called during recovery, while for the pointer of the management table, all non-pointer information is designated and in addition, the procedure called during recovery contains a process that sets the pointer of the management table corresponding to the permanent object that is recovered to NULL, wherein in the recovery process for the permanent object in the cache area, the permanent object to be recovered is determined on the basis of the non-pointer information of the management information and the absence or presence of a reference from the variable area that is the data area in the main memory apparatus that holds the variable of the application program, and a procedure that sets the pointer to NULL is called and executed.

11. The memory managing method of claim 10, wherein the procedure called during recovery of the area of the permanent object that is designated by the management information contains a process that expressly frees the data information when there is a reference to a data area outside the cache area in which the permanent object that is recovered is managed separately.

12. A database management system comprising:
reading means that reads the permanent object into the data area in the cache from a secondary memory apparatus on which the permanent object is stored in accordance with requests from an application program;
empty data area determination means that determines whether empty data areas exist for reading permanent objects from the secondary memory apparatus using the reading means;
reference determination means that determines whether the permanent object that exists in the cache has been referenced from the application program when it has been determined by the empty data area determination means that empty data areas do not exist; and
empty data area recovery means that recovers as the empty data area the data area in the cache in which a permanent object exists that has been determined to have been referenced from the application program by the reference determination means.

13. The database management system of claim 12, wherein the reading means in reading the data in the cache creates in the cache permanent object management information that contains the pointer used to reference the permanent object that has been read from the secondary memory apparatus to the cache and the reference absence-or-presence information indicating whether the permanent object have been referenced from the application program and that manages the permanent object in the cache, and a permanent object handler that has the permanent object read from the secondary memory apparatus and a pointer in order to reference the object management information that manages the permanent object, the reference determination means determining whether the permanent object handlers to which the pointers point are mutually referenced with the permanent object management information, viewing all of the data that exists in the application program as pointers for use in referencing the permanent objects in the cache, and sets the fact that there is a reference from the application program as the reference absence-or-presence information of the permanent object management information that is mutually referenced, and the empty data area recovery means recovers data areas on which are recorded permanent objects that are managed by the permanent object management information that the reference absence-or-presence information has not set to having a reference from the application program by means of the reference determination means on the basis of the permanent object management information.

14. The database management system of claim 13, wherein when the permanent object pointed to by the pointer that exists in the application program further contains a pointer pointing to another permanent object, the fact is set that there is a reference from the another application program to the reference absence-or-presence information of the permanent object management information that manages the permanent object that is pointed to by the pointer contained in the permanent object.

15. The database management system of claim 13, wherein when the permanent object pointed to by the pointer that exists in the application program further contains a pointer pointing to another permanent object, the value of the pointer pointing to the other permanent object is deleted and the state of the permanent object handler is set to invalid.

16. A memory management apparatus comprising:
data area managing means that records candidates for data areas on the main memory that are the target of recovery;
empty data area registering means which, when data that is recorded in a data area is read from the permanent data stored permanently in the secondary memory apparatus, registers this data area in the data area managing means; and
data area recovery means that recovers, as empty data areas, data areas that have been determined to be recoverable from among the candidates for data areas that are recorded by the data area managing means.

17. The memory managing apparatus of claim 16, wherein the data area recovery means determines that a data area is recoverable when there are no references to this data area from the application program.

18. A database management apparatus that recovers, out of the data areas on which data is recorded in the main memory, data areas which are not pointed to by pointers as empty data areas, said database management apparatus comprising:
permanent object reading means for reading into a cache in the main memory apparatus the permanent object from the secondary memory apparatus in which the permanent object is stored in accordance with requests from an application program;
permanent object management information creating means for creating in the cache the permanent object management information that includes a pointer to refer the permanent object read by said permanent object reading means and manages the permanent object, and permanent object handlers that have permanent objects that have been read from the secondary memory apparatus and pointers that reference the permanent object management information that manages the permanent objects;

data area management information memory means for managing the data areas in the main memory that store data containing the permanent object handlers and the permanent object management information and records data area management information containing pointer information designating whether the data that has been recorded on each data area managed by the data area management information is a pointer;

non-pointer setting means for setting the pointer information contained in the data area management information that manages data areas that store permanent object management information and all of the pointers referring to the permanent objects contained in the permanent object management information to not be pointers; and empty data area recovery means that recovers, as empty data areas, data areas pointed to by the data that contained in the data areas that have been designated to not be pointers based on the pointer information that is contained in the data area management information.

19. The database management system of claim 18, wherein when there are not references from the application program to the data area that is pointed to by data contained in the data areas that are designated as non-pointers, the empty data area recovery means recovers this data area as an empty data area.

* * * * *